United States Patent
Yajima et al.

(10) Patent No.: US 10,745,524 B2
(45) Date of Patent: Aug. 18, 2020

(54) FLUORINE-CONTAINING AND SILICON CONTAINING COMPOUND

(71) Applicants: OCHANOMIZU UNIVERSITY, Tokyo (JP); DAIKIN INDUSTRIES, LTD., Osaka-shi, Osaka (JP)

(72) Inventors: Tomoko Yajima, Tokyo (JP); Kana Sasahara, Tokyo (JP); Tadashi Kanbara, Osaka (JP); Tsuyoshi Noguchi, Osaka (JP)

(73) Assignees: OCHANOMIZU UNIVERSITY, Tokyo (JP); DAIKIN INDUSTRIES, LTD., Osaka (JP)

( * ) Notice: Subject to any disclaimer, the term of this patent is extended or adjusted under 35 U.S.C. 154(b) by 0 days.

(21) Appl. No.: 16/070,545

(22) PCT Filed: Jan. 20, 2017

(86) PCT No.: PCT/JP2017/002007
§ 371 (c)(1),
(2) Date: Jul. 17, 2018

(87) PCT Pub. No.: WO2017/126688
PCT Pub. Date: Jul. 27, 2017

(65) Prior Publication Data
US 2019/0023851 A1 Jan. 24, 2019

(30) Foreign Application Priority Data
Jan. 20, 2016 (JP) .................. 2016-008651

(51) Int. Cl.
| | |
|---|---|
| C08G 77/50 | (2006.01) |
| C07F 7/21 | (2006.01) |
| C08L 83/14 | (2006.01) |
| C08L 83/16 | (2006.01) |
| C08K 5/549 | (2006.01) |
| C08G 77/00 | (2006.01) |
| C08G 77/60 | (2006.01) |

(52) U.S. Cl.
CPC ............... *C08G 77/50* (2013.01); *C07F 7/21* (2013.01); *C08G 77/60* (2013.01); *C08K 5/549* (2013.01); *C08L 83/14* (2013.01); *C08L 83/16* (2013.01); *C08G 77/70* (2013.01); *C08G 77/80* (2013.01)

(58) Field of Classification Search
CPC ....... C08G 77/24; C08G 77/045; C08G 77/50
See application file for complete search history.

(56) References Cited

U.S. PATENT DOCUMENTS

| | | |
|---|---|---|
| 5,017,718 A | 5/1991 | Ojima et al. |
| 5,346,932 A | 9/1994 | Takahashi et al. |
| 6,511,217 B1 * | 1/2003 | Silvi ................. B29B 7/007 366/91 |
| 2009/0324968 A1 | 12/2009 | Huignard et al. |
| 2010/0286327 A1 | 11/2010 | Moorlag et al. |

FOREIGN PATENT DOCUMENTS

| | | | |
|---|---|---|---|
| CN | 101511847 A | | 8/2009 |
| CN | 104530719 A | * | 4/2015 |
| EP | 0 520 287 A2 | | 12/1992 |
| JP | 59-137424 A | | 8/1984 |
| JP | 03-221561 A | | 9/1991 |
| JP | 05-339007 A | | 12/1993 |
| JP | 06-049214 A | | 2/1994 |
| JP | 06-056854 A | | 3/1994 |
| JP | 2010-262290 A | | 11/2010 |
| JP | 2015-013972 A | | 1/2015 |

OTHER PUBLICATIONS

Zang (Synthesis of Perfluoroalkyl Siloxane with C=C and C–C Bridged Groups Through Single Electron Transfer Reaction. Phosphorus, Sulfur, and Silicon and the Related Elements. 2015, 190(7).*
Csapo (Hiyama Coupling Reaction of Fluorous Alkenyl-Fluorosilanes: Scope and Mechanistic Considerations. Journal of Fluorine Chemistry. 2012, 137, pp. 85-92).*
Zuodong (New Synthesis of Fluorinated Organosilicon Compounds, Gaodeng Xuexiao Huaxue Xuebao, 1987, 8(4), pp. 372-376).*
Google translation of CN 104530719 (2015, 4 pages).*
Appetecchi et al., "Novel polymeric systems for lithium-ion batteries gel electrolytes I. Cross-linked polyfluorosilicone", Electrochimica Acta, vol. 50, No. 1, pp. 149-158, 2004.
Extended European Search Report dated Jul. 16, 2019 in European Application No. 17741565.0.
International Preliminary Report on Patentability with Translation of Written Opinion dated Aug. 2, 2018, in counterpart International Application No. PCT/JP2017/002007.
Emmanuel Beyou, et al., "A Convenient Approach to Perfluorinated Organosilicons. Preparation of a Fluorinated Polysiloxane Precursor", Tetrahedron Letters, 1995, pp. 1843-1844, vol. 36, No. 11.
International Search Report for PCT/JP2017/002007 dated Feb. 21, 2017 [PCT/ISA/210].
Office Action dated Jun. 2, 2020 in corresponding Chinese Patent Application No. 201780007287.,2.
Zuodong et al "New Synthesis of Fluorinated Organosilicon Compounds" Gaodeng Xuexiao Huaxue Xuebao, 1987, 8(4), pp. 372-376.

* cited by examiner

*Primary Examiner* — Brieann R Johnston
(74) *Attorney, Agent, or Firm* — Sughrue Mion, PLLC

(57) ABSTRACT

The present invention provides a fluorine-containing, silicon-containing compound of formula (I):

$$T^1-(A-B)_n-T^2$$

which is useful as an additive.

6 Claims, No Drawings

FLUORINE-CONTAINING AND SILICON CONTAINING COMPOUND

CROSS REFERENCE TO RELATED APPLICATIONS

This application is a National Stage of International Application No. PCT/JP2017/002007 filed Jan. 20, 2017, claiming priority based on Japanese Patent Application No. 2016-008651 filed Jan. 20, 2016.

TECHNICAL FIELD

The present invention relates to a fluorine-containing and silicon-containing compound.

BACKGROUND ART

A large number of fluororesins are conventionally used in various fields since the fluororesins has high heat resistance and high chemical resistance. For example, such fluororesin is used itself as a material of fluororubber or used as an additive to fluororubber (Patent Document 1).

PRIOR ART DOCUMENT

Patent Document

Patent Document 1: Japanese Laid-Open Patent Publication No. 2015-13972

SUMMARY OF THE INVENTION

Problem to be Solved by the Invention

An object of the present invention is to provide a fluororesin used for various applications, for example, a fluororesin adjustable in balance of hydrophobicity and hydrophilicity and usable for hydrophilizing a hydrophobic polymer or hydrophobing a hydrophilic polymer.

Means to Solve the Problem

As a result of intensive studies, the present inventors conceived compounds of formulae (I) and (II).

Therefore, the present invention provides:

[1] A fluorine-containing and silicon-containing compound of formula (I):

wherein:

A is each independently at each occurrence $—R^3—R^2—R^1—R^2—R^4—$;

$R^1$ is $—(SiR^7R^8—O)_p—SiR^7R^8—$;

$R^7$ is independently at each occurrence a hydrogen atom, an optionally substituted alkyl group having 1-8 carbon atoms, an optionally substituted alkenyl group having 1-8 carbon atoms, an optionally substituted aryl group, a vinyl group, a vinyloxy group, or a vinylalkyl group having 3-8 carbon atoms;

$R^8$ is independently at each occurrence a hydrogen atom, an optionally substituted alkyl group having 1-8 carbon atoms, an optionally substituted alkenyl group having 1-8 carbon atoms, an optionally substituted aryl group, a vinyl group, a vinyloxy group, a vinylalkyl group having 3-8 carbon atoms, or $—R^{11}—R^{12}-Rf^1$;

$R^{11}$ is a single bond or $—(R^{25})_x—$;

$R^{25}$ is each independently alkylene having 1-6 carbon atoms, arylene having 6-10 carbon atoms, or $—O—$;

x is an integer of 1 to 3;

$R^{12}$ is $—CR^{13}=CR^{14}—$ or $—CR^{13}X^2CHR^{14}—$;

$R^{13}$ is each independently a hydrogen atom, an alkyl group having 1-3 carbon atoms, an ester group, a nitrile group, a nitro group, an alkoxy group having 1-3 carbon atoms, or an aryloxy group;

$R^{14}$ is each independently a hydrogen atom, an alkyl group having 1-3 carbon atoms, an ester group, a nitrile group, a nitro group, an alkoxy group having 1-3 carbon atoms, or an aryloxy group;

$X^2$ is each independently a hydrogen atom, an iodine atom, a bromine atom, or a chlorine atom;

$Rf^1$ is each independently a fluorine-containing alkyl group;

p is an integer of 0 to 50;

$R^2$ is each independently a single bond or $—(R^{26})_y—$;

$R^{26}$ is each independently alkylene having 1-6 carbon atoms, arylene having 6-10 carbon atoms, or $—O—$;

y is an integer of 1 to 3;

$R^3$ is a single bond, $—CR^5=CR^6—$, or $—CHR^5CR^6X^1—$;

$R^4$ is a single bond, $—CR^6=CR^5—$, or $—CR^6X^1CHR^5—$;

$R^5$ is each independently a hydrogen atom, an alkyl group having 1-3 carbon atoms, an ester group, a nitrile group, a nitro group, an alkoxy group having 1-3 carbon atoms, or an aryloxy group;

$R^6$ is each independently a hydrogen atom, an alkyl group having 1-3 carbon atoms, an ester group, a nitrile group, a nitro group, an alkoxy group having 1-3 carbon atoms, or an aryloxy group;

$X^1$ is each independently a hydrogen atom, an iodine atom, a bromine atom, or a chlorine atom;

B is independently at each occurrence a single bond or -$Rf^2$-;

$Rf^2$ is each independently a fluorine-containing alkylene group;

n is any integer not less than 1; and $T^1$ and $T^2$ are each independently an end group;

[2] The fluorine-containing and silicon-containing compound according to [1] of formula (I-1):

wherein:

A is each independently at each occurrence $—R^3—R^2—R^1—R^2—R^4—$;

$R^1$ is $—(SiR^7R^8—O)_p—SiR^7R^8—$;

$R^7$ is independently at each occurrence a hydrogen atom, an optionally substituted alkyl group having 1-8 carbon atoms, an optionally substituted alkenyl group having 1-8 carbon atoms, an optionally substituted aryl group, a vinyl group, a vinyloxy group, or a vinylalkyl group having 3-8 carbon atoms;

$R^8$ is independently at each occurrence a hydrogen atom, an optionally substituted alkyl group having 1-8 carbon atoms, an optionally substituted alkenyl group having 1-8 carbon atoms, an optionally substituted aryl group, a vinyl group, a vinyloxy group, or a vinylalkyl group having 3-8 carbon atoms;

p is an integer of 0 to 50;

$R^2$ is each independently a single bond or $—(R^{26})_y—$;

$R^{26}$ is each independently alkylene having 1-6 carbon atoms, arylene having 6-10 carbon atoms, or $—O—$;

y is an integer of 1 to 3;

$R^3$ is $—CR^5=CR^6—$ or $—CHR^5CR^6X^1—$;

$R^4$ is —$CR^6$=$CR^5$— or —$CR^6X^1CHR^5$—;

$R^5$ is each independently a hydrogen atom, an alkyl group having 1-3 carbon atoms, an ester group, a nitrile group, a nitro group, an alkoxy group having 1-3 carbon atoms, or an aryloxy group;

$R^6$ is each independently a hydrogen atom, an alkyl group having 1-3 carbon atoms, an ester group, a nitrile group, a nitro group, an alkoxy group having 1-3 carbon atoms, or an aryloxy group;

each $X^1$ is independently a hydrogen atom, an iodine atom, a bromine atom, or a chlorine atom;

B is independently at each occurrence -$Rf^2$-;

$Rf^2$ is each independently a fluorine-containing alkylene group;

n is any integer not less than 1; and $T^1$ and $T^2$ are each independently an end group;

[3] The fluorine-containing and silicon-containing compound according to [1] which is a compound of formula (I-2):

$$T^1\text{-}(A\text{-}B)_n\text{-}T^2$$

wherein:

A is each independently at each occurrence —$R^3$—$R^2$—$R^1$—$R^2$—$R^4$—;

$R^1$ is —$\{(SiR^7R^{8'}$—$O)_{p1}$—$(SiR^7R^{8''}$—$O)_{p2}\}$—$SiR^7R^8$—;

$R^7$ is independently at each occurrence a hydrogen atom, an optionally substituted alkyl group having 1-8 carbon atoms, an optionally substituted alkenyl group having 1-8 carbon atoms, an optionally substituted aryl group, a vinyl group, a vinyloxy group, or a vinylalkyl group having 3-8 carbon atoms;

$R^8$ is independently at each occurrence a hydrogen atom, an optionally substituted alkyl group having 1-8 carbon atoms, an optionally substituted alkenyl group having 1-8 carbon atoms, an optionally substituted aryl group, a vinyl group, a vinyloxy group, a vinylalkyl group having 3-8 carbon atoms, or —$R^{11}$—$R^{12}$-$Rf^1$;

$R^{8'}$ is independently at each occurrence a hydrogen atom, an optionally substituted alkyl group having 1-8 carbon atoms, an optionally substituted alkenyl group having 1-8 carbon atoms, an optionally substituted aryl group, a vinyl group, a vinyloxy group, or a vinylalkyl group having 3-8 carbon atoms;

$R^{8''}$ is independently at each occurrence —$R^{11}$—$R^{12}$-$Rf^1$;

$R^{11}$ is a single bond or —$(R^{25})_x$—;

$R^{25}$ is each independently alkylene having 1-6 carbon atoms, arylene having 6-10 carbon atoms, or —O—;

x is an integer of 1 to 3;

$R^{12}$ is —$CR^{13}$=$CR^{14}$— or —$CR^{13}X^2CHR^{14}$—;

$R^{13}$ is each independently a hydrogen atom, an alkyl group having 1-3 carbon atoms, an ester group, a nitrile group, a nitro group, an alkoxy group having 1-3 carbon atoms, or an aryloxy group;

$R^{14}$ is each independently a hydrogen atom, an alkyl group having 1-3 carbon atoms, an ester group, a nitrile group, a nitro group, an alkoxy group having 1-3 carbon atoms, or an aryloxy group;

$X^2$ is each independently a hydrogen atom, an iodine atom, a bromine atom, or a chlorine atom;

$Rf^1$ is each independently a fluorine-containing alkyl group;

p1 is an integer of 0 to 50;

p2 is an integer of 0 to 50;

the occurrence order of the respective repeating units in parentheses with the subscript p1 or p2 is not limited in the formula;

$R^2$ is each independently a single bond or —$(R^{26})_y$—;

$R^{26}$ is each independently alkylene having 1-6 carbon atoms, arylene having 6-10 carbon atoms, or —O—;

y is an integer of 1 to 3;

$R^3$ is a single bond, —$CR^5$=$CR^6$—, or —$CHR^5CR^6X^1$—;

$R^4$ is a single bond, —$CR^6$=$CR^5$—, or —$CR^6X^1CHR^5$—;

$R^5$ is each independently a hydrogen atom, an alkyl group having 1-3 carbon atoms, an ester group, a nitrile group, a nitro group, an alkoxy group having 1-3 carbon atoms, or an aryloxy group;

$R^6$ is each independently a hydrogen atom, an alkyl group having 1-3 carbon atoms, an ester group, a nitrile group, a nitro group, an alkoxy group having 1-3 carbon atoms, or an aryloxy group;

$X^1$ is each independently a hydrogen atom, an iodine atom, a bromine atom, or a chlorine atom;

B is a single bond;

n is 1; and $T^1$ and $T^2$ are each independently a hydrogen atom, an alkyl group having 1-6 carbon atoms, an aryl group, or $Rf^1$];

[4] The fluorine-containing and silicon-containing compound according to [3] which is a compound of formula (I-2a):

$$T^1\text{-}(A\text{-}B)_n\text{-}T^2$$

wherein:

A is each independently at each occurrence —$R^3$—$R^2$—$R^1$—$R^2$—$R^4$—;

$R^1$ is —$\{(SiR^7R^{8'}$—$O)_{p1}$—$(SiR^7R^{8''}$—$O)_{p2}\}$—$SiR^7R^8$—;

$R^7$ is independently at each occurrence a hydrogen atom, an optionally substituted alkyl group having 1-8 carbon atoms, an optionally substituted alkenyl group having 1-8 carbon atoms, an optionally substituted aryl group, a vinyl group, a vinyloxy group, or a vinylalkyl group having 3-8 carbon atoms;

$R^8$ is independently at each occurrence a hydrogen atom, an optionally substituted alkyl group having 1-8 carbon atoms, an optionally substituted alkenyl group having 1-8 carbon atoms, an optionally substituted aryl group, a vinyl group, a vinyloxy group, a vinylalkyl group having 3-8 carbon atoms, or —$R^{11}$—$R^{12}$-$Rf^1$;

$R^{8'}$ is independently at each occurrence a hydrogen atom, an optionally substituted alkyl group having 1-8 carbon atoms, an optionally substituted alkenyl group having 1-8 carbon atoms, an optionally substituted aryl group, a vinyl group, a vinyloxy group, or a vinylalkyl group having 3-8 carbon atoms;

$R^{8''}$ is independently at each occurrence —$R^{11}$—$R^{12}$-$Rf^1$;

$R^{11}$ is a single bond or —$(R^{25})_x$—;

$R^{25}$ is each independently alkylene having 1-6 carbon atoms, arylene having 6-10 carbon atoms, or —O—;

x is an integer of 1 to 3;

$R^{12}$ is —$CR^{13}$=$CR^{14}$— or —$CR^{13}X^2CHR^{14}$—;

$R^{13}$ is each independently a hydrogen atom, an alkyl group having 1-3 carbon atoms, an ester group, a nitrile group, a nitro group, an alkoxy group having 1-3 carbon atoms, or an aryloxy group;

$R^{14}$ is each independently a hydrogen atom, an alkyl group having 1-3 carbon atoms, an ester group, a nitrile group, a nitro group, an alkoxy group having 1-3 carbon atoms, or an aryloxy group;

$X^2$ is each independently a hydrogen atom, an iodine atom, a bromine atom, or a chlorine atom;

$Rf^1$ is each independently a fluorine-containing alkyl group;

p1 is an integer of 0 to 50;

p2 is an integer of 1 to 50;

the occurrence order of the respective repeating units in parentheses with the subscript p1 or p2 is not limited in the formula;

$R^2$ is a single bond;

$R^3$ is a single bond;

$R^4$ is a single bond;

B is a single bond;

n is 1; and $T^1$ and $T^2$ are each independently a hydrogen atom, an alkyl group having 1-6 carbon atoms, or an aryl group;

[5] The fluorine-containing and silicon-containing compound according to [3] which is a compound of formula (I-2b):

$$T^1\text{-}(A\text{-}B)_n\text{-}T^2$$

wherein:

A is each independently at each occurrence —$R^3$—$R^2$—$R^1$—$R^2$—$R^4$—;

$R^1$ is —{(SiR$^7$R$^{8'}$—O)$_{p1}$—SiR$^7$R$^{8'}$—;

$R^7$ is independently at each occurrence a hydrogen atom, an optionally substituted alkyl group having 1-8 carbon atoms, an optionally substituted alkenyl group having 1-8 carbon atoms, an optionally substituted aryl group, a vinyl group, a vinyloxy group, or a vinylalkyl group having 3-8 carbon atoms;

$R^{8'}$ is independently at each occurrence a hydrogen atom, an optionally substituted alkyl group having 1-8 carbon atoms, an optionally substituted alkenyl group having 1-8 carbon atoms, an optionally substituted aryl group, a vinyl group, a vinyloxy group, or a vinylalkyl group having 3-8 carbon atoms;

p is an integer of 0 to 50;

each $R^2$ is independently a single bond or —$(R^{26})_y$—;

each $R^{26}$ is independently alkylene having 1-6 carbon atoms, arylene having 6-10 carbon atoms, or —O—;

y is an integer of 1 to 3;

$R^3$ is —CR$^5$=CR$^6$— or —CHR$^5$CR$^6$X$^1$—;

$R^4$ is —CR$^6$=CR$^5$— or —CR$^6$X$^1$CHR$^5$—;

$R^5$ is each independently a hydrogen atom, an alkyl group having 1-3 carbon atoms, an ester group, a nitrile group, a nitro group, an alkoxy group having 1-3 carbon atoms, or an aryloxy group;

$R^6$ is each independently a hydrogen atom, an alkyl group having 1-3 carbon atoms, an ester group, a nitrile group, a nitro group, an alkoxy group having 1-3 carbon atoms, or an aryloxy group;

$X^1$ is each independently a hydrogen atom, an iodine atom, a bromine atom, or a chlorine atom;

B is a single bond;

n is 1;

$T^1$ and $T^2$ are each independently $Rf^1$; and $Rf^1$ is each independently a fluorine-containing alkyl group];

[6] A fluorine-containing and silicon-containing compound which is a silsesquioxane derivative of formula (II):

$$-(R^{31}SiO_{1.5})_m-$$

wherein:

$R^{31}$ is independently at each occurrence a hydrogen atom, an optionally substituted alkyl group having 1-11 carbon atoms, an optionally substituted alkenyl group having 2-11 carbon atoms, an optionally substituted aryl group, a vinyl group, a vinyloxy group, a vinylalkyl group having 3-11 carbon atoms, or —R$^{32}$—R$^{33}$-Rf$^3$, or two R$^{31}$ together form —R$^{32}$—R$^{33}$-Rf$^4$-R$^{36}$—R$^{32}$—;

$R^{32}$ is each independently a single bond or —$(R^{37})_z$—;

$R^{37}$ is each independently alkylene having 1-6 carbon atoms, arylene having 6-10 carbon atoms, or —O—;

z is an integer of 1 to 3;

$R^{33}$ is —CR$^{34}$=CR$^{35}$— or —CR$^{34}$X$^3$CHR$^{35}$—;

$R^{36}$ is —CR$^{35}$=CR$^{34}$— or —CHR$^{35}$CR$^{34}$X$^3$—;

$R^{34}$ is each independently a hydrogen atom, an alkyl group having 1-3 carbon atoms, an ester group, a nitrile group, a nitro group, an alkoxy group having 1-3 carbon atoms, or an aryloxy group;

$R^{35}$ is each independently a hydrogen atom, an alkyl group having 1-3 carbon atoms, an ester group, a nitrile group, a nitro group, an alkoxy group having 1-3 carbon atoms, or an aryloxy group;

$X^3$ is each independently a hydrogen atom, an iodine atom, a bromine atom, or a chlorine atom;

$Rf^3$ is each independently a fluorine-containing alkyl group;

$Rf^4$ is each independently a fluorine-containing alkylene group;

at least one $Rf^3$ or $Rf^4$ is present in the formula; and m is an arbitrary number;

[7] A fluorine-containing and silicon-containing compound wherein silsesquioxane derivatives of formula (II):

$$-(R^{31}SiO_{1.5})_m-$$

wherein:

$R^{31}$ is independently at each occurrence a hydrogen atom, an optionally substituted alkyl group having 1-11 carbon atoms, an optionally substituted alkenyl group having 2-11 carbon atoms, an optionally substituted aryl group, a vinyl group, a vinyloxy group, a vinylalkyl group having 3-11 carbon atoms, or —R$^{32}$—R$^{33}$-Rf$^3$, or two R$^{31}$ together form —R$^{32}$—R$^{33}$-Rf$^4$-R$^{36}$—R$^{32}$—;

$R^{32}$ is each independently a single bond or —$(R^{37})_z$—;

$R^{37}$ is each independently alkylene having 1-6 carbon atoms, arylene having 6-10 carbon atoms, or —O—;

z is an integer of 1 to 3;

$R^{33}$ is —CR$^{34}$=CR$^{35}$— or —CR$^{34}$X$^3$CHR$^{35}$—;

$R^{36}$ is —CR$^{35}$=CR$^{34}$— or —CHR$^{35}$CR$^{34}$X$^3$—;

$R^{34}$ is each independently a hydrogen atom, an alkyl group having 1-3 carbon atoms, an ester group, a nitrile group, a nitro group, an alkoxy group having 1-3 carbon atoms, or an aryloxy group;

$R^{35}$ is each independently a hydrogen atom, an alkyl group having 1-3 carbon atoms, an ester group, a nitrile group, a nitro group, an alkoxy group having 1-3 carbon atoms, or an aryloxy group;

$X^3$ is each independently a hydrogen atom, an iodine atom, a bromine atom, or a chlorine atom;

$Rf^3$ is each independently a fluorine-containing alkyl group;

$Rf^4$ is each independently a fluorine-containing alkylene group;

at least one $Rf^3$ or $Rf^4$ is present in the formula; and m is an arbitrary number is crosslinked by a crosslinking agent containing a -Rf$^7$- wherein Rf$^7$ is each independently a fluorine-containing alkylene group;

[8] A composition comprising the fluorine-containing and silicon-containing compound according to [1]-[7]; and

[9] An article comprising a base material and a film obtained by using the composition according to [8] on the base material.

Effect of the Invention

According to the present invention, by introducing silicon and fluorine into one molecule, oxygen plasma resistance can be imparted to a perfluoro-sealing material, and a compound having a high affinity to the perfluoro-sealing material can be obtained.

EMBODIMENTS TO CARRY OUT THE INVENTION

In one embodiment, the fluorine-containing and silicon-containing compound of the present invention is of formula (I):

wherein:

A is each independently at each occurrence —$R^3$—$R^2$—$R^1$—$R^2$—$R^4$—;

$R^1$ is —$(SiR^7R^8$—$O)_p$—$SiR^7R^8$—;

$R^7$ is independently at each occurrence a hydrogen atom, an optionally substituted alkyl group having 1-8 carbon atoms, an optionally substituted alkenyl group having 1-8 carbon atoms, an optionally substituted aryl group, a vinyl group, a vinyloxy group, or a vinylalkyl group having 3-8 carbon atoms;

$R^8$ is independently at each occurrence a hydrogen atom, an optionally substituted alkyl group having 1-8 carbon atoms, an optionally substituted alkenyl group having 1-8 carbon atoms, an optionally substituted aryl group, a vinyl group, a vinyloxy group, a vinylalkyl group having 3-8 carbon atoms, or —$R^{11}$—$R^{12}$-$Rf^1$;

$R^{11}$ is a single bond or —$(R^{25})_x$—;

$R^{25}$ is each independently alkylene having 1-6 carbon atoms, arylene having 6-10 carbon atoms, or —O—;

x is an integer of 1 to 3;

$R^{12}$ is —$CR^{13}$=$CR^{14}$— or —$CR^{13}X^2CHR^{14}$—;

$R^{13}$ is each independently a hydrogen atom, an alkyl group having 1-3 carbon atoms, an ester group, a nitrile group, a nitro group, an alkoxy group having 1-3 carbon atoms, or an aryloxy group;

$R^{14}$ is each independently a hydrogen atom, an alkyl group having 1-3 carbon atoms, an ester group, a nitrile group, a nitro group, an alkoxy group having 1-3 carbon atoms, or an aryloxy group;

$X^2$ is each independently a hydrogen atom, an iodine atom, a bromine atom, or a chlorine atom;

$Rf^1$ is each independently a fluorine-containing alkyl group;

p is an integer of 0 to 50;

$R^2$ is each independently a single bond or —$(R^{26})_y$—;

$R^{26}$ is each independently alkylene having 1-6 carbon atoms, arylene having 6-10 carbon atoms, or —O—;

y is an integer of 1 to 3;

$R^3$ is a single bond, —$CR^5$=$CR^6$—, or —$CHR^5CR^6X^1$—;

$R^4$ is a single bond, —$CR^6$=$CR^5$—, or —$CR^6X^1CHR^5$—;

$R^5$ is each independently a hydrogen atom, an alkyl group having 1-3 carbon atoms, an ester group, a nitrile group, a nitro group, an alkoxy group having 1-3 carbon atoms, or an aryloxy group;

$R^6$ is each independently a hydrogen atom, an alkyl group having 1-3 carbon atoms, an ester group, a nitrile group, a nitro group, an alkoxy group having 1-3 carbon atoms, or an aryloxy group;

$X^1$ is each independently a hydrogen atom, an iodine atom, a bromine atom, or a chlorine atom;

B is independently at each occurrence a single bond or -$Rf^2$-;

$Rf^2$ is each independently a fluorine-containing alkylene group;

n is any integer not less than 1; and $T^1$ and $T^2$ are each independently an end group.

In the formula, A is each independently at each occurrence —$R^3$—$R^2$—$R^1$—$R^2$—$R^4$—.

$R^1$ is —$(SiR^7R^8$—$O)_p$—$SiR^7R^8$—.

$R^7$ is independently at each occurrence a hydrogen atom, an optionally substituted alkyl group having 1-8 carbon atoms, an optionally substituted alkenyl group having 1-8 carbon atoms, an optionally substituted aryl group, a vinyl group, a vinyloxy group, or a vinylalkyl group having 3-8 carbon atoms.

The "alkyl group" of the optionally substituted alkyl group having 1-8 carbon atoms may be straight or branched. The alkyl group having 1-8 carbon atoms may be preferably an alkyl group having 1-6 carbon atoms, more preferably an alkyl group having 1-4 carbon atoms.

The substituent in the optionally substituted alkyl group having 1-8 carbon atoms is not particularly limited, and examples thereof include a halogen atom (e.g., a fluorine atom, a chlorine atom, or a bromine atom, preferably a fluorine atom); one or more groups selected from a $C_{1-6}$ alkyl group, a $C_{2-6}$ alkenyl group, a $C_{2-6}$ alkynyl group, a $C_{3-10}$ cycloalkyl group, $C_{3-10}$ unsaturated cycloalkyl group, a 5- to 10-membered heterocyclyl group, a 5- to 10-membered unsaturated heterocyclyl group, a $C_{6-10}$ aryl group, and a 5- to 10-membered heteroaryl group optionally substituted by one or more halogen atoms (e.g., a fluorine atom, a chlorine atom, or a bromine atom, preferably a fluorine atom).

Examples of the optionally substituted alkyl group having 1-8 carbon atoms are not particularly limited and include, for example, unsubstituted or fluorine-substituted methyl, ethyl, n-propyl, isopropyl, n-butyl, sec-butyl, or tert-butyl.

The "alkenyl group" in the optionally substituted alkenyl group having 1-8 carbon atoms may be straight or branched. The alkenyl group having 1-8 carbon atoms may be preferably an alkenyl group having 1-6 carbon atoms, more preferably an alkenyl group having 1-4 carbon atoms.

Examples of the substituent in the optionally substituted alkenyl group include the groups described above for the alkyl group.

The "aryl group" in the optionally substituted aryl group may be monocyclic or polycyclic. The aryl group is preferably an aryl group having 6-10 carbon atoms.

Examples of the substituent in the optionally substituted aryl group include the groups described above for the alkyl group.

Examples of the optionally substituted aryl group are not particularly limited and include, for example, a phenyl group unsubstituted or substituted by a fluorine atom or a $C_{1-6}$ alkyl group (preferably a $C_{1-3}$ alkyl group, e.g., methyl).

The vinylalkyl group having 3-8 carbon atoms is a group that one hydrogen atom of the alkyl group is substituted by a vinyl group and is also represented by $CH_2$=$CH$—$C_{1-6}$ alkyl. The alkyl group may be straight or branched and is preferably straight. The substitution position of the vinyl group is not particularly limited and is preferably the end of the alkyl group.

Examples of the vinylalkyl group having 3-8 carbon atoms are not particularly limited and include, for example, $CH_2$=$CH$—$CH_2$—, $CH_2$=$CH$—$CH_2CH_2$—, or $CH_2$=$CH$—$CH_2CH_2CH_2$—.

In a preferable embodiment, $R^7$ is independently at each occurrence a hydrogen atom, a methyl group, an ethyl group, an n-propyl group, a phenyl group, a vinyl group, an aryl group, or a 3,3,3-trifluoropropyl group. In one embodiment, $R^7$ may be a hydrogen atom or a methyl group.

$R^8$ is independently at each occurrence a hydrogen atom, an optionally substituted alkyl group having 1-8 carbon atoms, an optionally substituted alkenyl group having 1-8 carbon atoms, an optionally substituted aryl group, a vinyl group, a vinyloxy group, a vinylalkyl group having 3-8 carbon atoms, or $-R^{11}-R^{12}-Rf^1$.

The optionally substituted alkyl group having 1-8 carbon atoms, the optionally substituted alkenyl group having 1-8 carbon atoms, the optionally substituted aryl group, and the vinylalkyl group having 3-8 carbon atoms are as defined for $R^7$.

$R^{11}$ is independently at each occurrence a single bond or $-(R^{25})_x-$.

$R^{25}$ is independently each alkylene having 1-6 carbon atoms (preferably alkylene having 1-3 carbon atoms, more preferably methylene), arylene having 6-10 carbon atoms (preferably phenylene), or $-O-$.

x is an integer of 1 to 3.

Examples of $R^{25}$ include, for example, alkylene, phenylene, -alkylene-phenylene-, -phenylene-alkylene-, $-O-$alkylene-, $-O$-phenylene-, $-O$-alkylene-phenylene-, $-O$-phenylene-alkylene-, -alkylene-$O-$, -phenylene-$O-$, alkylene-phenylene-$O-$, or -phenylene-alkylene-$O-$. The alkylene is preferably alkylene having 1-3 carbon atoms, more preferably methylene.

$R^{13}$ is independently at each occurrence $-CR^{13}=CR^{14}-$ or $-CR^{13}X^2CHR^{14}-$.

In one embodiment, $R^{12}$ is $-CR^{13}=CR^{14}-$.

In another embodiment, $R^{12}$ is $-CR^{13}X^2CHR^{14}-$.

$R^{13}$ is independently at each occurrence a hydrogen atom, an alkyl group having 1-3 carbon atoms (preferably a methyl group), an ester group, a nitrile group, a nitro group, an alkoxy group having 1-3 carbon atoms (preferably a methoxy group), or an aryloxy group (preferably a phenoxy group), preferably a hydrogen atom or an alkyl group having 1-3 carbon atoms, more preferably a hydrogen atom.

$R^{14}$ is independently at each occurrence a hydrogen atom, an alkyl group having 1-3 carbon atoms (preferably methyl group), an ester group, a nitrile group, a nitro group, an alkoxy group having 1-3 carbon atoms (preferably a methoxy group), or an aryloxy group (preferably a phenoxy group), preferably a hydrogen atom or an alkyl group having 1-3 carbon atoms, more preferably a hydrogen atom.

In one embodiment, at least one of $R^{13}$ and $R^{14}$ is a hydrogen atom.

$X^2$ is independently at each occurrence a hydrogen atom, an iodine atom, a bromine atom, or a chlorine atom, preferably an iodine atom, a bromine atom, or a chlorine atom, more preferably an iodine atom or a bromine atom, further preferably an iodine atom.

$Rf^1$ is independently at each occurrence a fluorine-containing alkyl group. This fluorine-containing alkyl group may be straight or branched and may have one or more substituents.

Examples of the substituents include the groups described above for the alkyl group of $R^7$.

The fluorine-containing alkyl group may be preferably a fluorine-containing alkyl group having 1-10 carbon atoms, more preferably a fluorine-containing alkyl group having 2-6 carbon atoms 2-6 carbon atoms. In a preferable embodiment, the fluorine-containing alkyl group may be straight. In a preferable embodiment, the fluorine-containing alkyl group may be unsubstituted.

In the fluorine-containing alkyl group, the number of fluorine atoms is not particularly limited. Therefore, the fluorine-containing alkyl group may be a group in which hydrogen atoms on carbon atoms in a main chain of the alkyl group are partially substituted by fluorine atoms or may be a group in which all hydrogen atoms on carbon atoms in a main chain of the alkyl group are substituted by fluorine atoms (so-called perfluoroalkyl group).

In one embodiment, the fluorine-containing alkyl group is a group represented by $-R^{16}_q-R^{17}-R^{18}$.

$R^{16}$ is each independently $CH_2$ or CHF. In one embodiment, $R^{16}$ is $CH_2$.

$R^{17}$ is a perfluoroalkylene group having 1-8 carbon atoms. The perfluoroalkylene group may be straight or branched and is preferably straight. $R^{17}$ is preferably perfluoromethylene or perfluoroethylene.

$R^{18}$ is each independently a hydrogen atom, a fluorine atom, $CH_3$, $CH_2F$, $CHF_2$, or $CF_3$. In one embodiment, $R^{18}$ is a fluorine atom or $CF_3$.

The q is an integer of 0 to 6, for example, an integer of 0 to 3, or 0 or 1. In one embodiment, q is 0. In another embodiment, q is an integer of 1 to 6, for example, 1.

In a preferable embodiment, the fluorine-containing alkyl group may be $-CH_2CF_3$, $-CH_2CF_2CF_3$, $-CH_2(CF_2)_3CF_3$, $-CH_2(CF_2)_5CF_3$, $-CH_2(CF_2)_7CF_3$, $-CF_3$, $-CF_2CF_3$, $-(CF_2)_3CF_3$, $-(CF_2)_5CF_3$, or $-(CF_2)_7CF_3$.

In a preferable embodiment, $R^7$ and $R^8$ are each independently an alkyl group having 1-8 carbon atoms or an aryl group, preferably a methyl group or a phenyl group.

In the formula, p is an integer of 0 to 2000, for example, an integer of 1 to 2000. Preferably, p is an integer of 1 to 250, more preferably an integer of 5 to 50. In one embodiment, p may be 0 or 1.

The $R^2$ is a single bond or $-(R^{26})_y-$.

$R^{26}$ is each independently alkylene having 1-6 carbon atoms (preferably alkylene having 1-3 carbon atoms), arylene having 6-10 carbon atoms, or $-O-$.

y is an integer of 1 to 3.

Examples of $R^{26}$ include, for example, alkylene, phenylene, -alkylene-phenylene-, -phenylene-alkylene-, $-O-$alkylene-, $-O$-phenylene-, $-O$-alkylene-phenylene-, $-O$-phenylene-alkylene-, -alkylene-$O-$, -phenylene-$O-$, alkylene-phenylene-$O-$, or -phenylene-alkylene-$O-$. The alkylene is preferably alkylene having 1-3 carbon atoms, more preferably methylene.

$R^3$ is a single bond, $-CR^5=CR^6-$ or $-CHR^5CR^6X^1-$.

$R^4$ is a single bond, $-CR^6=CR^5-$ or $-CR^6X^1CHR^5-$.

$R^5$ is each independently a hydrogen atom, or an alkyl group having 1-3 carbon atoms (preferably a methyl group), an ester group, a nitrile group, a nitro group, an alkoxy group having 1-3 carbon atoms (preferably a methoxy group), or an aryloxy group (preferably a phenoxy group), preferably a hydrogen atom or an alkyl group having 1-3 carbon atoms, more preferably a hydrogen atom.

Each $R^6$ is independently a hydrogen atom, an alkyl group having 1-3 carbon atoms (preferably a methyl group), an ester group, a nitrile group, a nitro group, an alkoxy group having 1-3 carbon atoms (preferably a methoxy group), or an aryloxy group (preferably a phenoxy group), preferably a hydrogen atom, or an alkyl group having 1-3 carbon atoms, and more preferably a hydrogen atom.

In one embodiment, at least one of $R^5$ and $R^6$ is a hydrogen atom.

$X^1$ is each independently a hydrogen atom, an iodine atom, a bromine atom, or a chlorine atom, preferably an iodine atom, a bromine atom, or a chlorine atom, more preferably an iodine atom or a bromine atom, further preferably iodine atom.

In one embodiment, $R^3$ is —$CR^5$=$CR^6$— and $R^4$ is —$CR^6$=$CR^5$—.

In another embodiment, $R^3$ is —$CHR^5CR^6X^1$— and R4 is —$CR^6X^1CHR^5$—.

In the formula, B is $Rf^2$.

$Rf^2$ is a fluorine-containing alkylene group. This fluorine-containing alkylene group may be straight or branched and may have one or more substituents.

Examples of the substituents include the groups described above for the alkyl group of $R^7$.

The fluorine-containing alkylene group may preferably be a fluorine-containing alkylene group having 1-10 carbon atoms, more preferably a fluorine-containing alkylene group having 2-6 carbon atoms. In a preferable embodiment, the fluorine-containing alkylene group may be straight. In a preferable embodiment, the fluorine-containing alkylene group may be unsubstituted.

In the fluorine-containing alkylene group, the number of fluorine atoms is not particularly limited. Therefore, the fluorine-containing alkylene group may be a group in which hydrogen atoms on carbon atoms in a the main chain of the alkylene group are partially substituted by fluorine atoms or may be a group in which hydrogen atoms on carbon atoms in a the main chain of the alkylene group are all substituted by fluorine atoms (so-called perfluoroalkylene group).

In one embodiment, the fluorine-containing alkylene group is a group represented by —$R^{21}{}_s$—$R^{22}$—$R^{21}{}_t$—.

$R^{21}$ is each independently $CH_2$ or CHF. In one embodiment, $R^{21}$ is $CH_2$.

$R^{22}$ is a perfluoroalkylene group having 1-8 carbon atoms. The perfluoroalkylene group may be straight or branched and is preferably straight. $R^{22}$ is preferably perfluoromethylene or perfluoroethylene.

s and t are each independently an integer of 0 to 6, for example, an integer of 0 to 3, or 0 or 1. In one embodiment, s and t are 0. In another embodiment, s and t are integers of 1 to 6, for example, 1.

In a preferable embodiment, the fluorine-containing alkylene group may be —$CH_2CF_2CH_2$—, —$CH_2CF_2CF_2CH_2$—, —$CH_2(CF_2)_4CH_2$—, —$CH_2(CF_2)_6CH_2$—, —$CH_2(CF_2)_8CH_2$—, —$CF_2$—, —$CF_2CF_2$—, —$(CF_2)_4$—, —$(CF_2)_6$—, or —$(CF_2)_8$—.

In the formula, n may be any integer not less than 1. Depending on a desired degree of polymerization (or a molecular weight), n is appropriately selected.

Preferably, n may be an integer of 1 to 2000, more preferably an integer of 3 to 500, further preferably an integer of 5 to 200.

In the formula, $T^1$ and $T^2$ represent end groups. $T^1$ and $T^2$ are not particularly limited and may have a structure corresponding to a raw material or a terminator used for synthesis.

In one embodiment, $T^1$ and $T^2$ may each independently be a hydrogen atom, an alkyl group having 1-6 carbon atoms, an aryl group, an aryloxy group, a hydroxyl group, an ester group, an alkyl carbonate group, an aryl carbonate group, an alkoxy group having 1-6 carbon atoms, —$SiR^8{}_3$, or $Rf^1$.

In formula (I), at least one $Rf^1$ or $Rf^2$ is present.

The average molecular weight of the fluorine-containing and silicon-containing compound of formula (I) is not particularly limited and can appropriately be set depending on a purpose such as use. For example, in one embodiment, the weight average molecular weight of the fluorine-containing and silicon-containing compound of formula (I) of the present invention is $5 \times 10^2$ to $5 \times 10^5$, preferably $5 \times 10^2$ to $1 \times 10^5$, and particularly preferably $1 \times 10^3$ to $3 \times 10^4$.

In one embodiment, the fluorine-containing and silicon-containing compound of formula (I) is of formula (I-1):

$$T^1\text{-}(A\text{-}B)_n\text{-}T^2 \qquad (I\text{-}1)$$

wherein:

A is each independently at each occurrence —$R^3$—$R^2$—$R^1$—$R^2$—$R^4$—;

$R^1$ is —$(SiR^7R^8$—$O)_p$—$SiR^7R^8$—;

$R^7$ is independently at each occurrence a hydrogen atom, an optionally substituted alkyl group having 1-8 carbon atoms, an optionally substituted alkenyl group having 1-8 carbon atoms, an optionally substituted aryl group, a vinyl group, a vinyloxy group, or a vinylalkyl group having 3-8 carbon atoms;

$R^8$ is independently at each occurrence a hydrogen atom, an optionally substituted alkyl group having 1-8 carbon atoms, an optionally substituted alkenyl group having 1-8 carbon atoms, an optionally substituted aryl group, a vinyl group, a vinyloxy group, or a vinylalkyl group having 3-8 carbon atoms;

p is an integer of 0 to 50;

$R^2$ is each independently a single bond or —$(R^{26})_y$—;

$R^{26}$ is each independently alkylene having 1-6 carbon atoms, arylene having 6-10 carbon atoms, or —O—;

y is an integer of 1 to 3;

$R^3$ is —$CR^5$=$CR^6$— or —$CHR^5CR^6X^1$—;

$R^4$ is —$CR^6$=$CR^5$— or —$CR^6X^1CHR^5$—;

$R^5$ is each independently a hydrogen atom, an alkyl group having 1-3 carbon atoms, an ester group, a nitrile group, a nitro group, an alkoxy group having 1-3 carbon atoms, or an aryloxy group;

$R^6$ is each independently a hydrogen atom, an alkyl group having 1-3 carbon atoms, an ester group, a nitrile group, a nitro group, an alkoxy group having 1-3 carbon atoms, or an aryloxy group;

$X^1$ is each independently a hydrogen atom, an iodine atom, a bromine atom, or a chlorine atom;

B is independently at each occurrence -$Rf^2$-;

$Rf^2$ is each independently a fluorine-containing alkylene group;

n is any integer not less than 1; and $T^1$ and $T^2$ are each independently an end group.

In formula (I-1), A is preferably —$CR^5$=$CR^6$—$R^2$—$R^1$—$R^2$—$CR^6$=$CR^5$— (hereinafter also referred to as "A'") or $CHR^5CR^6X^1$—$R^2$—$R^1$—$R^2$—$CR^6X^1CHR^5$— (hereinafter also referred to as "A''").

In one embodiment of formula (I-1), A is —$CR^5$=$CR^6$—$R^2$—$R^1$—$R^2$—$CR^6$=$CR^5$—. Therefore, -(A-B)$_n$— is -(A'-B)$_n$—.

In another embodiment of formula (I-1), some A are —$CR^5$=$CR^6$—$R^2$—$R^1$—$R^2$—$CR^6$=$CR^5$— and the remaining A are —$CHR^5CR^6X$—$R^2$—$R^1$—$R^2$—$CR^6XCHR^5$—. Therefore, -(A-B)$_n$— is -(A'-B)$_{n'}$-(A''-B)$_{n''}$— (in the formula, n' and n'' are each independently any integer, and the occurrence order of the respective repeating units in parentheses with the subscript n' or n'' is not limited).

In another embodiment of formula (I-1), A is —$CHR^5CR^6X$—$R^2$—$R^1$—$R^2$—$CR^6XCHR^5$—. Therefore, -(A-B)$_n$— is -(A''-B)$_n$—.

In formula (I-1), preferably, $R^7$ may independently at each occurrence be a hydrogen atom, an optionally substituted alkyl group having 1-8 carbon atoms, or an optionally substituted aryl group. In a preferable embodiment, $R^7$ is independently at each occurrence a hydrogen atom, a methyl group, an ethyl group, an n-propyl group, a phenyl group, a vinyl group, an aryl group, a 3,3,3-trifluoropropyl group. In one embodiment, $R^7$ may be a hydrogen atom or a methyl group.

In formula (I-1), preferably, $R^8$ may independently at each occurrence be a hydrogen atom, an optionally substituted alkyl group having 1-8 carbon atoms, or an optionally substituted aryl group. In a preferable embodiment, $R^8$ is independently at each occurrence a hydrogen atom, a methyl group, an ethyl group, an n-propyl group, a phenyl group, a vinyl group, an aryl group, or a 3,3,3-trifluoropropyl group. In one embodiment, $R^8$ may be a hydrogen atom or a methyl group.

The average molecular weight of the fluorine-containing and silicon-containing compound of formula (I-1) is not particularly limited and can appropriately be set depending on a purpose such as use. For example, in one embodiment, the weight average molecular weight of the fluorine-containing and silicon-containing compound of formula (I-1) of the present invention is $5 \times 10^2$ to $5 \times 10^5$, preferably $5 \times 10^2$ to $1 \times 10^5$, and particularly preferably $1 \times 10^3$ to $3 \times 10^4$.

The fluorine-containing and silicon-containing compound of formula (I-1) can be obtained by addition polymerization of a diene corresponding to a structure of A and a dihalide corresponding to a structure of B.

Specifically, the addition polymerization is performed between a diene of formula (A1):

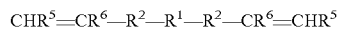

wherein $R^1$, $R^2$, $R^5$, and $R^6$ are as defined for $R^1$, $R^2$, $R^5$, and $R^6$, respectively, in the description of formula (I-1) and a compound of formula (B1):

wherein B and $X^1$ are as defined for B and $X^1$, respectively, in the description of formula (I-1).

A compound obtained by the reaction described above is a compound of formula (I-1a):

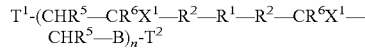

wherein, $R^1$, $R^2$, $R^5$, $R^6$, $X^1$, B, $T^1$, $T^2$, and n have the same meaning as in the description of formula (I-1) (i.e., a polymer of $T^1$-(A"-B)$_n$-$T^2$), or a compound of formula (I-1b):

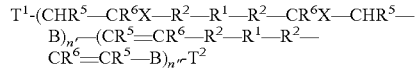

wherein $R^1$, $R^2$, $R^5$, $R^6$, $X^1$, B, $T^1$, $T^2$, n', and n" are as defined in the description of formula (I-1)
(i.e., a polymer of -(A"-B)$_{n'}$-(A'-B)$_{n''}$—),
or a mixture thereof.

In a preferable embodiment, the addition polymerization is initiated by generating radicals with ultraviolet irradiation, visible-light irradiation in the presence of a photoredox catalyst, addition of a one-electron reducing agent, or addition of a radical generator.

Although a light source of ultraviolet light is not limited as long as the light source emits ultraviolet light, examples thereof include a mercury lamp, a xenon lamp, a UV (ultraviolet) lamp, a halogen lamp, a LED (light-emitting diode), etc., and a high-pressure mercury lamp is preferably used.

For the "photoredox catalyst", for example, rhodamine B, ethion Y, [Ru(bpy)$_3$]$^{2+}$ analog, [Ir(bpy)$_3$]$^+$ analog, etc. are usable.

The "one-electron reducing agent" may be, for example, lithium dithionite, sodium dithionite, potassium dithionite, cesium dithionite, copper (I) iodide, copper (I) bromide, copper (I) chloride, triethylamine, tributylamine, tetrabutylammonium iodide, tetrabutylphosphonium iodide, ascorbic acid, or ascorbate, and is preferably sodium dithionite, copper (I) iodide, or copper (I) bromide, particularly preferably sodium dithionite.

For the "radical generator", an organic peroxide, an inorganic peroxide, an organic azo compound, etc. are usable, and organic peroxide is preferably used. Although not limited to the following, for example, benzoyl peroxide, potassium persulfite, and AIBN are usable as the organic peroxide, the inorganic peroxide, and the organic azo compound, respectively.

The conditions of the addition polymerization described above are not particularly limited and can appropriately be selected by those skilled in the art depending on a raw material used and a desired product.

The polymer of -(A"-B)$_n$— or the polymer of -(A"-B)$_{n'}$-(A'-B)$_{n''}$— obtained as described above can be subjected to a dehydrohalogenation reaction in the presence of a base to obtain a compound of formula (I-1c):

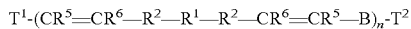

wherein $R^1$, $R^2$, $R^5$, $R^6$, B, $T^1$, $T^2$, and n are as defined in the description of formula (I-1) (i.e., a polymer represented by -(A'-B)$_n$—).

The reaction conditions of the dehalogenation reaction are not particularly limited and can appropriately be selected by those skilled in the art depending on a raw material used.

In one embodiment, the fluorine-containing and silicon-containing compound of formula (I) is of formula (I-2).

$$T^1\text{-(A-B)}_n\text{-}T^2 \qquad (\text{I-2})$$

wherein:

A is each independently at each occurrence —$R^3$—$R^2$—$R^1$—$R^2$—$R^4$—;

$R^1$ is —{(Si$R^7R^{8'}$—O)$_{p1}$—(Si$R^7R^{8''}$—O)$_{p2}$}—Si$R^7R^8$—;

$R^7$ is independently at each occurrence a hydrogen atom, an optionally substituted alkyl group having 1-8 carbon atoms, an optionally substituted alkenyl group having 1-8 carbon atoms, an optionally substituted aryl group, a vinyl group, a vinyloxy group, or a vinylalkyl group having 3-8 carbon atoms;

$R^8$ is independently at each occurrence a hydrogen atom, an optionally substituted alkyl group having 1-8 carbon atoms, an optionally substituted alkenyl group having 1-8 carbon atoms, an optionally substituted aryl group, a vinyl group, a vinyloxy group, a vinylalkyl group having 3-8 carbon atoms, or —$R^{11}$—$R^{12}$-Rf$^1$;

$R^{8'}$ is independently at each occurrence a hydrogen atom, an optionally substituted alkyl group having 1-8 carbon atoms, an optionally substituted alkenyl group having 1-8 carbon atoms, an optionally substituted aryl group, a vinyl group, a vinyloxy group, or a vinylalkyl group having 3-8 carbon atoms;

$R^8$ is independently at each occurrence —$R^{11}$—$R^{12}$-Rf$^1$;

$R^{11}$ is a single bond or —(R$^{25}$)$_x$—;

each $R^{25}$ is independently alkylene having 1-6 carbon atoms;

x is an integer of 1 to 3;

$R^{12}$ is —C$R^{13}$=C$R^{14}$— or —C$R^{13}X^2$CH$R^{14}$—;

$R^{13}$ is each independently a hydrogen atom, an alkyl group having 1-3 carbon atoms, an ester group, a nitrile group, a nitro group, an alkoxy group having 1-3 carbon atoms, or an aryloxy group;

$R^{14}$ is each independently a hydrogen atom, an alkyl group having 1-3 carbon atoms, an ester group, a nitrile group, a nitro group, an alkoxy group having 1-3 carbon atoms, or an aryloxy group;

$X^2$ is each independently a hydrogen atom, an iodine atom, a bromine atom, or a chlorine atom;

$Rf^1$ is each independently a fluorine-containing alkyl group;

p1 is an integer of 0 to 50;

p2 is an integer of 0 to 50;

the occurrence order of the respective repeating units in parentheses with the subscript p1 or p2 is not limited;

$R^2$ is each independently a single bond or $—(R^{26})_y—$;

$R^{26}$ is each independently alkylene having 1-6 carbon atoms, arylene having 6-10 carbon atoms, or —O—;

y is an integer of 1 to 3;

$R^3$ is a single bond, $—CR^5=CR^6—$, or $—CHR^5CR^6X^1—$;

$R^4$ is a single bond, $—CR^6=CR^5—$, or $—CR^6X^1CHR^5—$;

$R^5$ is each independently a hydrogen atom, an alkyl group having 1-3 carbon atoms, an ester group, a nitrile group, a nitro group, an alkoxy group having 1-3 carbon atoms, or an aryloxy group;

$R^6$ is each independently a hydrogen atom, an alkyl group having 1-3 carbon atoms, an ester group, a nitrile group, a nitro group, an alkoxy group having 1-3 carbon atoms, or an aryloxy group;

$X^1$ is each independently a hydrogen atom, an iodine atom, a bromine atom, or a chlorine atom;

B is a single bond;

n is 1; and $T^1$ and $T^2$ are each independently a hydrogen atom, an alkyl group having 1-6 carbon atoms, an aryl group, or $Rf^1$.

In formula (I-2), $R^7$ may independently at each occurrence be preferably a hydrogen atom, an optionally substituted alkyl group having 1-8 carbon atoms, or an optionally substituted aryl group.

In formula (I-2), the sum of p1 and p2 may be preferably 1 or more, more preferably 5 or more, further preferably 10 or more.

The average molecular weight of the fluorine-containing and silicon-containing compound of formula (I-2) is not particularly limited and can appropriately be set depending on a purpose such as use. For example, in one embodiment, the weight average molecular weight of the fluorine-containing and silicon-containing compound of formula (I-2) of the present invention is $5 \times 10^2$ to $5 \times 10^5$, preferably $5 \times 10^2$ to $1 \times 10^5$, and particularly preferably $1 \times 10^3$ to $3 \times 10^4$.

In one embodiment, the fluorine-containing and silicon-containing compound of formula (I-2) is of formula (I-2a):

$T^1\text{-}(A\text{-}B)_n\text{-}T^2$ (I-2a)

wherein:

A is each independently at each occurrence $—R^3—R^2—R^1—R^2—R^4—$;

$R^1$ is $—\{(SiR^7R^{8'}—O)_{p1}—(SiR^7R^{8''}—O)_{p2}\}—SiR^7R^8—$;

$R^7$ is independently at each occurrence a hydrogen atom, an optionally substituted alkyl group having 1-8 carbon atoms, an optionally substituted alkenyl group having 1-8 carbon atoms, an optionally substituted aryl group, a vinyl group, a vinyloxy group, or a vinylalkyl group having 3-8 carbon atoms;

$R^8$ is independently at each occurrence a hydrogen atom, an optionally substituted alkyl group having 1-8 carbon atoms, an optionally substituted alkenyl group having 1-8 carbon atoms, an optionally substituted aryl group, a vinyl group, a vinyloxy group, a vinylalkyl group having 3-8 carbon atoms, or $—R^{11}—R^{12}\text{-}Rf^1$;

$R^{8'}$ is independently at each occurrence a hydrogen atom, an optionally substituted alkyl group having 1-8 carbon atoms, an optionally substituted alkenyl group having 1-8 carbon atoms, an optionally substituted aryl group, a vinyl group, a vinyloxy group, or a vinylalkyl group having 3-8 carbon atoms;

$R^{8''}$ is independently at each occurrence $—R^{11}—R^{12}\text{-}Rf^1$;

$R^{11}$ is a single bond or $—(R^{25})_x—$;

each $R^{25}$ is independently alkylene having 1-6 carbon atoms, arylene having 6-10 carbon atoms, or —O—;

x is an integer of 1 to 3;

$R^{12}$ is $—CR^{13}=CR^{14}—$ or $—CR^{13}X^2CHR^{14}—$;

$R^{13}$ is each independently a hydrogen atom, an alkyl group having 1-3 carbon atoms, an ester group, a nitrile group, a nitro group, an alkoxy group having 1-3 carbon atoms, or an aryloxy group;

$R^{14}$ is each independently a hydrogen atom, an alkyl group having 1-3 carbon atoms, an ester group, a nitrile group, a nitro group, an alkoxy group having 1-3 carbon atoms, or an aryloxy group;

$X^2$ is each independently a hydrogen atom, an iodine atom, a bromine atom, or a chlorine atom;

$Rf^1$ is each independently a fluorine-containing alkyl group;

p1 is an integer of 0 to 50;

p2 is an integer of 1 to 50;

the occurrence order of the respective repeating units in parentheses with the subscript p1 and p2 is not limited;

$R^2$ is a single bond;

$R^3$ is a single bond;

$R^4$ is a single bond;

B is a single bond;

n is 1; and $T^1$ and $T^2$ are each independently a hydrogen atom, an alkyl group having 1-6 carbon atoms, or an aryl group.

In formula (I-2a), $R^{8'}$ may independently at each occurrence be preferably a vinyl group or a vinylalkyl group having 3-8 carbon atoms, more preferably $CH_2=CH—$, $CH_2=CH—CH_2—$, $CH_2=CH—CH_2CH_2—$, or $CH_2=CH—CH_2CH_2CH_2—$, further preferably $CH_2=CH—$ or $CH_2=CH—CH_2—$. In one embodiment, $R^{8'}$ may be $CH_2=CH—$, $CH_2=CH—CH_2—$, $CH_2=CH—CH_2CH_2—$, or $CH_2=CH—CH_2CH_2CH_2—$, preferably $CH_2=CH—$ or $CH_2=CH—CH_2—$.

In formula (I-2a), preferably, $R^7$ may independently at each occurrence be a hydrogen atom, an optionally substituted alkyl group having 1-8 carbon atoms, or an optionally substituted aryl group. In a preferable embodiment, $R^7$ is independently at each occurrence a hydrogen atom, a methyl group, an ethyl group, an n-propyl group, a phenyl group, a vinyl group, an aryl group, or a 3,3,3-trifluoropropyl group. In one embodiment, $R^7$ may be a hydrogen atom or a methyl group.

In one embodiment, $R^{12}$ is $—CR^{13}=CR^{14}—$.

In another embodiment, $R^{12}$ is $—CR^{13}X^2CHR^{14}—$.

In formula (I-2a), the sum of p1 and p2 is preferably 1 or more, more preferably 5 or more, further preferably 10 or more.

The average molecular weight of the fluorine-containing and silicon-containing compound of formula (I-2a) is not particularly limited and can appropriately be set depending on a purpose such as use. For example, in one embodiment, the weight average molecular weight of the fluorine-containing and silicon-containing compound of formula (I-2a)

of the present invention is $5 \times 10^2$ to $5 \times 10^5$, preferably $5 \times 10^2$ to $1 \times 10^5$, and particularly preferably $1 \times 10^3$ to $3 \times 10^4$.

The fluorine-containing and silicon-containing compound of formula (I-2a) can be obtained by an addition reaction of a halide to a silicone compound having one or more vinyl groups corresponding to the structure of A.

Specifically, to the silicone compound of formula (A2a):

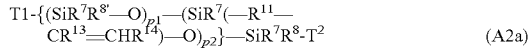

wherein $R^7$, $R^8$, $R^{8'}$, $R^{13}$, $R^{14}$, $T^1$, $T^2$, p1, and p2 are as defined for $R^7$, $R^8$, $R^{8'}$, $R^{13}$, $R^{14}$, $T^1$, $T^2$, p1, and p2, respectively, in the description of formula (I-2a), the halide of formula (C):

wherein $Rf^1$ and $X^2$ are as defined for $Rf^1$ and $X^2$, respectively, in the description of formula (I-2a).

In another embodiment, to all or some of the vinyl groups of the silicone compound of formula (A2a'):

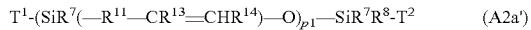

wherein $R^7$, $R^8$, $R^{11}$, $R^{13}$, $R^{14}$, $T^1$, $T^2$, and p1 are as defined for $R^7$, $R^8$, $R^{11}$, $R^{13}$, $R^{14}$, $T^1$, $T^2$, and p1, respectively, in the description of formula (I-2a), the halide of formula (C):

wherein $Rf^1$ and $X^2$ are as defined for $Rf^1$ and $X^2$ and $X^2$, respectively, in the description of formula (I-2a) may be added.

The addition reaction provides a compound of formula (I-2a) wherein $R^{12}$ is $-CR^{13}X^2CHR^{14}-$.

In a preferable embodiment, the addition reaction is initiated by ultraviolet irradiation, visible-light irradiation in the presence of a photoredox catalyst, addition of a one-electron reducing agent, or addition of a radical generator.

Although a light source of ultraviolet light is not limited as long as the light source emits ultraviolet light, examples thereof include a mercury lamp, a xenon lamp, a UV (ultraviolet) lamp, a halogen lamp, a LED (light-emitting diode), etc., and a high-pressure mercury lamp is preferably used.

For the "photoredox catalyst", for example, rhodamine B, ethion Y, [Ru(bpy)$_3$]$^{2+}$ analog, [Ir(bpy)$_3$]$^+$ analog, etc. are usable.

The "one-electron reducing agent" may be, for example, lithium dithionite, sodium dithionite, potassium dithionite, cesium dithionite, copper (I) iodide, copper (I) bromide, copper (I) chloride, triethylamine, tributylamine, tetrabutylammonium iodide, tetrabutylphosphonium iodide, ascorbic acid, or ascorbate, and is preferably sodium dithionite, copper (I) iodide, or copper (I) bromide, particularly preferably sodium dithionite.

For the "radical generator", an organic peroxide, an inorganic peroxide, an organic azo compound, etc. are usable, and organic peroxide is preferably used. Although not limited to the following, for example, benzoyl peroxide, potassium persulfite, and AIBN are usable as the organic peroxide, the inorganic peroxide, and the organic azo compound, respectively.

The conditions of the addition reaction described above are not particularly limited and can appropriately be selected by those skilled in the art depending on a raw material used and a desired product.

By subjecting the compound of formula (I-2a) wherein $R^{12}$ is $-CR^{13}X^2CHR^{14}-$ obtained as described above to a dehydrohalogenation reaction in the presence of a base, a compound of formula (I-2a) wherein $R^{12}$ is $-CR^{13}=CR^{14}-$ can be obtained.

The reaction conditions of the dehalogenation reaction are not particularly limited and can appropriately be selected by those skilled in the art depending on a raw material used.

In one embodiment, the fluorine-containing and silicon-containing compound of formula (I-2) is of formula (I-2b):

wherein:

A is each independently at each occurrence $-R^3-R^2-R^1-R^2-R^4-$;

$R^1$ is $-\{(SiR^7R^{8'}-O)_{p1}-SiR^7R^{8'}-\}$;

$R^7$ is independently at each occurrence a hydrogen atom, an optionally substituted alkyl group having 1-8 carbon atoms, an optionally substituted alkenyl group having 1-8 carbon atoms, an optionally substituted aryl group, a vinyl group, a vinyloxy group, or a vinylalkyl group having 3-8 carbon atoms;

$R^{8'}$ is independently at each occurrence a hydrogen atom, an optionally substituted alkyl group having 1-8 carbon atoms, an optionally substituted alkenyl group having 1-8 carbon atoms, an optionally substituted aryl group, a vinyl group, a vinyloxy group, or a vinylalkyl group having 3-8 carbon atoms;

p is an integer of 0 to 50;

$R^2$ is each independently a single bond or $-(R^{26})_y-$;

$R^{26}$ is each independently alkylene having 1-6 carbon atoms, arylene having 6-10 carbon atoms, or $-O-$;

y is an integer of 1 to 3;

$R^3$ is $-CR^5=CR^6-$ or $-CHR^5CR^6X^1-$;

$R^4$ is $-CR^6=CR^5-$ or $-CR^6X^1CHR^5-$;

$R^5$ is each independently a hydrogen atom, an alkyl group having 1-3 carbon atoms, an ester group, a nitrile group, a nitro group, an alkoxy group having 1-3 carbon atoms, or an aryloxy group;

$R^6$ is each independently a hydrogen atom, an alkyl group having 1-3 carbon atoms, an ester group, a nitrile group, a nitro group, an alkoxy group having 1-3 carbon atoms, or an aryloxy group;

$X^1$ is each independently a hydrogen atom, an iodine atom, a bromine atom, or a chlorine atom;

B is a single bond;

n is 1;

$T^1$ and $T^2$ are each independently $Rf^1$; and $Rf^1$ is each independently a fluorine-containing alkyl group.

In formula (I-2b), preferably, $R^7$ may independently at each occurrence be a hydrogen atom, an optionally substituted alkyl group having 1-8 carbon atoms, or an optionally substituted aryl group. In a preferable embodiment, $R^7$ is independently at each occurrence a hydrogen atom, a methyl group, an ethyl group, an n-propyl group, a phenyl group, a vinyl group, an aryl group, a 3,3,3-trifluoropropyl group. In one embodiment, $R^7$ may be a hydrogen atom or a methyl group.

In formula (I-2b), preferably, $R^{8'}$ may be independently at each occurrence a hydrogen atom, an optionally substituted alkyl group having 1-8 carbon atoms, or an optionally substituted aryl group. In a preferable embodiment, $R^{8'}$ is independently at each occurrence a hydrogen atom, a methyl group, an ethyl group, an n-propyl group, a phenyl group, a vinyl group, an aryl group, or a 3,3,3-trifluoropropyl group. In one embodiment, R8' may be a hydrogen atom or a methyl group.

In one embodiment, $R^3$ is $-CR^5=CR^6-$ and $R^4$ is $-CR^6=CR^5-$.

In another embodiment, $R^3$ is —$CHR^5CR^6X^1$— and R4 is —$CR^6X^1CHR^5$—.

In formula (I-2b), p1 is preferably 1 or more, more preferably 5 or more, further preferably 10 or more.

The average molecular weight of the fluorine-containing and silicon-containing compound of formula (I-2b) is not particularly limited and can appropriately be set depending on a purpose such as use. For example, in one embodiment, the weight average molecular weight of the fluorine-containing and silicon-containing compound of formula (I-2b) of the present invention is $5\times10^2$ to $5\times10^6$, preferably $1\times10^3$ to $3\times10^4$.

The fluorine-containing and silicon-containing compound of formula (I-2b) can be obtained by an addition reaction of a halide to a silicone compound having vinyl groups at both ends corresponding to the structure of A.

Specifically, to the silicone compound of formula (A2b):

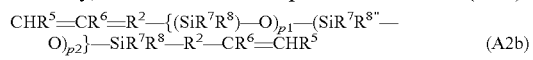

wherein $R^2$, $R^5$, $R^6$, $R^7$, $R^8$, $R^{8'}$, $R^{8''}$, p1, and p2 are as defined for $R^2$, $R^5$, $R^6$, $R^7$, $R^8$, $R^{8'}$, $R^{8''}$, p1, and p2, respectively, in the description of formula (I-2b), the halide of formula (C):

wherein $Rf^1$ and $X^2$ are as defined for $Rf^1$ and $X^2$, respectively, in the description of formula (I-2a) is added.

The addition reaction provides a compound of formula (I-2b) wherein $R^3$ is —$CHR^5CR^6X^1$— and $R^4$ is —$CR^6X^1CHR^5$—.

In a preferable embodiment, the addition reaction is initiated by ultraviolet irradiation, visible-light irradiation in the presence of a photoredox catalyst, addition of a one-electron reducing agent, or addition of a radical generator.

Although a light source of ultraviolet light is not limited as long as the light source emits ultraviolet light, examples thereof include a mercury lamp, a xenon lamp, a UV (ultraviolet) lamp, a halogen lamp, a LED (light-emitting diode), etc., and a high-pressure mercury lamp is preferably used.

For the "photoredox catalyst", for example, rhodamine B, ethion Y, $[Ru(bpy)_3]^{2+}$ analog, $[Ir(bpy)_3]^+$ analog, etc. are usable.

The "one-electron reducing agent" may be, for example, lithium dithionite, sodium dithionite, potassium dithionite, cesium dithionite, copper (I) iodide, copper (I) bromide, copper (I) chloride, triethylamine, tributylamine, tetrabutylammonium iodide, tetrabutylphosphonium iodide, ascorbic acid, or ascorbate, and is preferably sodium dithionite, copper (I) iodide, or copper (I) bromide, particularly preferably sodium dithionite.

For the "radical generator", an organic peroxide, an inorganic peroxide, an organic azo compound, etc. are usable, and organic peroxide is preferably used. Although not limited to the following, for example, benzoyl peroxide, potassium persulfite, and AIBN are usable as the organic peroxide, the inorganic peroxide, and the organic azo compound, respectively.

The conditions of the addition reaction described above are not particularly limited and can appropriately be selected by those skilled in the art depending on a raw material used and a desired product.

By subjecting the compound of formula (I-2b) wherein $R^3$ is —$CHR^5CR^6X^1$— and $R^4$ is —$CR^6X^1CHR^5$— to the dehydrohalogenation reaction in the presence of a base, a compound of formula (I-2b) wherein $R^3$ is —$CR^5=CR^6$— and $R^4$ is —$CR^6=CR^5$— can be obtained.

The reaction conditions of the dehalogenation reaction are not particularly limited and can appropriately be selected by those skilled in the art depending on a raw material used.

In another embodiment, the fluorine-containing and silicon-containing compound of the present invention is a silsesquioxane derivative of formula (II):

wherein:

$R^{31}$ is independently at each occurrence a hydrogen atom, an optionally substituted alkyl group having 1-11 carbon atoms, preferably 1-8 carbon atoms, more preferably 1-6 carbon atoms, an optionally substituted alkenyl group having 2-11 carbon atoms, preferably 2-8 carbon atoms, more preferably 2-6 carbon atoms, an optionally substituted aryl group, a vinyl group, a vinyloxy group, a vinylalkyl group having 3-11 carbon atoms, preferably 3-8 carbon atoms, more preferably 3-6 carbon atoms, or —$R^{32}$—$R^{33}$-$Rf^3$, or two $R^{31}$ together form —$R^{32}$—$R^{33}$-$Rf^4$-$R^{36}$—$R^{32}$—;

$R^{32}$ is each independently a single bond or —$(R^{37})_z$—;

$R^{37}$ is each independently alkylene having 1-6 carbon atoms, arylene having 6-10 carbon atoms, or —O—;

z is an integer of 1 to 3;

$R^{33}$ is —$CR^{34}=CR^{35}$— or —$CR^{34}X^3CHR^{35}$—;

$R^{36}$ is —$CR^{35}=CR^{34}$— or —$CHR^{35}CR^{34}X^3$—;

$R^{34}$ is each independently a hydrogen atom, an alkyl group having 1-3 carbon atoms, an ester group, a nitrile group, a nitro group, an alkoxy group having 1-3 carbon atoms, or an aryloxy group;

$R^{35}$ is each independently a hydrogen atom, an alkyl group having 1-3 carbon atoms, an ester group, a nitrile group, a nitro group, an alkoxy group having 1-3 carbon atoms, or an aryloxy group;

$X^3$ is each independently a hydrogen atom, an iodine atom, a bromine atom, or a chlorine atom;

$Rf^3$ is each independently a fluorine-containing alkyl group;

$Rf^4$ is each independently a fluorine-containing alkylene group;

in the formula, at least one $Rf^3$ or $Rf^4$ is present; and m is an arbitrary number.

$R^{31}$ is independently at each occurrence a hydrogen atom, an optionally substituted alkyl group having 1-11 carbon atoms, preferably 1-8 carbon atoms, more preferably 1-6 carbon atoms, an optionally substituted alkenyl group having 2-11 carbon atoms, preferably the carbon number of 2 to 8, more preferably 2-6 carbon atoms, an optionally substituted aryl group, a vinyl group, a vinyloxy group, a vinylalkyl group having 3-11 carbon atoms, preferably 3-8 carbon atoms, more preferably 3-6 carbon atoms, or —$R^{32}$—$R^{33}$-$Rf^3$, or two $R^{31}$ together form —$R^{32}$—$R^{33}$-$Rf^4$-$R^{36}$—$R^{32}$—.

The optionally substituted alkyl group having 1-11 carbon atoms, the optionally substituted aryl group, the optionally substituted alkenyl group having 2-11 carbon atoms, the vinyl group, the vinyloxy group, and the vinylalkyl group having 3-11 carbon atoms are as defined for $R^7$ in Formula (I).

In one embodiment, $R^{31}$ is independently at each occurrence a hydrogen atom, an optionally substituted alkyl group having 1-11 carbon atoms, an optionally substituted alkenyl group having 2-11 carbon atoms, an optionally substituted aryl group, a vinyl group, a vinyloxy group, a vinylalkyl group having 3-11 carbon atoms, or —$R^{32}$—$R^{33}$-$Rf^3$.

In another embodiment, two $R^{31}$ together form —$R^{32}$—$R^{33}$-$Rf^4$—$R^{36}$—$R^{32}$1—. Therefore, a Si atom is intramolecularly crosslinked by —$R^{32}$—$R^{33}$-$Rf^4$-$R^{36}$—$R^{32}$—.

$R^{32}$ is each independently a single bond or —$(R^{37})_z$—.

$R^{37}$ is each independently alkylene having 1-6 carbon atoms (preferably alkylene having 1-3 carbon atoms), arylene having 6-10 carbon atoms, or —O—.

z is an integer of 1 to 3.

Examples of $R^{37}$ include, for example, alkylene, phenylene, -alkylene-phenylene-, -phenylene-alkylene-, —O-alkylene-, —O-phenylene-, —O-alkylene-phenylene-, —O-phenylene-alkylene-, -alkylene-O—, -phenylene-O—, alkylene-phenylene-O—, or -phenylene-alkylene-O—. The alkylene is preferably alkylene having 1-3 carbon atoms, more preferably methylene.

$R^{33}$ is —CR$^{34}$=CR$^{35}$— or —CR$^{34}$X$^3$CHR$^{35}$—.

In one embodiment, $R^{33}$ is —CR$^{34}$=CR$^{35}$—.

In another embodiment, R33 is —CR$^{34}$X$^3$CHR$^{35}$—.

$R^{36}$ is —CR$^{35}$=CR$^{34}$— or —CHR$^{35}$CR$^{34}$X$^3$—.

In one embodiment, $R^{36}$ is —CR$^{35}$=CR$^{34}$—.

In another embodiment, $R^{36}$ is —CHR$^{35}$CR$^{34}$X$^3$—.

$R^{34}$ is each independently a hydrogen atom or an alkyl group having 1-3 carbon atoms (preferably a methyl group) and is preferably a hydrogen atom.

$R^{35}$ is each independently a hydrogen atom or an alkyl group having 1-3 carbon atoms (preferably a methyl group) and is preferably a hydrogen atom.

In one embodiment, at least one of $R^{34}$ and $R^{35}$ is a hydrogen atom.

$x^3$ is each independently a hydrogen atom, an iodine atom, a bromine atom, or a chlorine atom, preferably an iodine atom, a bromine atom, or a chlorine atom, more preferably an iodine atom or a bromine atom, further preferably an iodine atom.

$Rf^3$ is each independently a fluorine-containing alkyl group. The fluorine-containing alkyl group is as defined for the fluorine-containing alkyl group described above in $Rf^1$. $Rf^3$ may preferably be an alkyl group having 1-6 carbon atoms, more preferably an alkyl group having 1-4 carbon atoms, further preferably an alkyl group having 1-4 carbon atoms, for example, an alkyl group having 1-4 carbon atoms. Such fluorine-containing alkyl group may be straight or branched and may have one or more substituents.

In one embodiment, at least one $R^{31}$ may be an aryl group.

$Rf^4$ is each independently a fluorine-containing alkylene group. The fluorine-containing alkylene group is as defined for the fluorine-containing alkylene group in $Rf^2$. Such fluorine-containing alkylene group may be straight or branched and may have one or more substituents.

In the formula, m may be any number. Depending on a desired degree of polymerization (or molecular weight), m is appropriately selected. In one embodiment, m may be 8.1 or more, more preferably 8.5 or more, and further preferably 9.0 or more. Additionally, m may be preferably 8.1 to 20, more preferably 8.5 to 15, and further preferably 9.0 to 14.

A terminal of the silsesquioxane derivative of —(R$^{31}$SiO$_{1.5}$)$_m$— is not particularly limited and may have a structure corresponding to a raw material or a terminator used for synthesis.

The silsesquioxane derivative of —(R$^{31}$SiO$_{1.5}$)$_m$— may be of a random type, a cage type, or a ladder type and is preferably a random type or a cage type. In one embodiment, the silsesquioxane derivative of —(R$^{31}$SiO$_{1.5}$)$_m$— is a compound other than a cage type having m of 8. In another embodiment, the silsesquioxane derivative of —(R$^{31}$SiO$_{1.5}$)$_m$— may be a random-type or cage-type, preferably cage-type compound wherein $R^{31}$ is an aryl group.

In one embodiment, —(R$^{31}$SiO$_{1.5}$)$_m$— is [Ph-Si—O$_{1.5}$]$_l$-[RfCH$_2$CH(I)—Si—O$_{1.5}$]$_m$—[CH$_2$=CH—Si—O$_{1.5}$]$_n$ wherein 1/(1+m+n)×100 is 60 or more, preferably 75 or more, more preferably 85 or more.

The average molecular weight of the fluorine-containing and silicon-containing compound of formula (II) is not particularly limited and can appropriately be set depending on a purpose such as use. For example, in one embodiment, the weight average molecular weight of the fluorine-containing and silicon-containing compound of formula (II) of the present invention is $5×10^2$ to $5×10^5$, preferably $5×10^2$ to $1×10^5$, and particularly preferably $1×10^3$ to $3×10^4$.

The fluorine-containing and silicon-containing compound of formula (II) can be obtained by an addition reaction of a halide to a silsesquioxane compound having one or more vinyl groups corresponding to a —(R$^{31}$SiO$_{1.5}$)$_m$— structure.

Specifically, to the silsesquioxane compound of formula (II'):

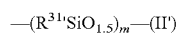

wherein $R^{31'}$ is independently at each occurrence $R^{31}$ or —R$^{32}$—CR$^{34}$=CHR$^{35}$;

$R^{31}$, $R^{32}$, $R^{34}$, $R^{35}$, and m are as defined for $R^{31}$, $R^{32}$, $R^{34}$, $R^{35}$, and m, respectively, in the description of formula (II); and in the formula, at least one $R^{31'}$ is —R$^{32}$—CR$^{34}$=CHR$^{35}$, the halide of formula (C) or formula (D):

wherein $Rf^3$, $Rf^4$, $X^3$, and $X^4$ are as defined for $Rf^3$, $Rf^4$, $X^3$, and $X^4$, respectively, in the description of formula (II) is added.

The addition reaction provides a compound of formula (II) wherein $R^{33}$ is —CR$^{34}$X$^3$CHR$^{35}$— and $R^{36}$ is —CHR$^{35}$CR$^{34}$X$^3$—.

In a preferable embodiment, the addition reaction is initiated by ultraviolet irradiation, visible-light irradiation in the presence of a photoredox catalyst, addition of a one-electron reducing agent, or addition of a radical generator.

Although a light source of ultraviolet light is not limited as long as the light source emits ultraviolet light, examples thereof include a mercury lamp, a xenon lamp, a UV (ultraviolet) lamp, a halogen lamp, a LED (light-emitting diode), etc., and a high-pressure mercury lamp is preferably used.

For the "photoredox catalyst", for example, rhodamine B, ethion Y, [Ru(bpy)$_3$]$^{2+}$ analog, [Ir(bpy)$_3$]$^+$ analog, etc. are usable.

The "one-electron reducing agent" may be, for example, lithium dithionite, sodium dithionite, potassium dithionite, cesium dithionite, copper (I) iodide, copper (I) bromide, copper (I) chloride, triethylamine, tributylamine, tetrabutylammonium iodide, tetrabutylphosphonium iodide, ascorbic acid, or ascorbate, and is preferably sodium dithionite, copper (I) iodide, or copper (I) bromide, particularly preferably sodium dithionite.

For the "radical generator", an organic peroxide, an inorganic peroxide, an organic azo compound, etc. are usable, and organic peroxide is preferably used. Although not limited to the following, for example, benzoyl peroxide, potassium persulfite, and AIBN are usable as the organic peroxide, the inorganic peroxide, and the organic azo compound, respectively.

The conditions of the addition reaction described above are not particularly limited and can appropriately be selected by those skilled in the art depending on a raw material used and a desired product.

By subjecting the compound of formula (II) wherein $R^{33}$ is —CR$^{34}$X$^3$CHR$^{35}$—, obtained as described above to a dehydrohalogenation reaction in the presence of a base, a compound of formula (II) wherein $R^{33}$ is —$CR^{34}$=$CR^{35}$— can be obtained.

The reaction conditions of the dehalogenation reaction are not particularly limited and can appropriately be selected by those skilled in the art depending on a raw material used.

In another embodiment, the fluorine-containing and silicon-containing compound of the present invention is a fluorine-containing and silicon-containing compound (hereinafter also referred to as a "crosslinked fluorine-containing and silicon-containing compound") that a silsesquioxane derivative of formula (II):

$$—(R^{31}SiO_{1.5})_m—$$

wherein:

$R^{31}$ is independently at each occurrence a hydrogen atom, an optionally substituted alkyl group having 1-11 carbon atoms, preferably 1-8 carbon atoms, more preferably 1-6 carbon atoms, an optionally substituted alkenyl group having 2-11 carbon atoms, preferably 2-8 carbon atoms, more preferably 2-6 carbon atoms, an optionally substituted aryl group, a vinyl group, a vinyloxy group, a vinylalkyl group having 3-8 carbon atoms, or —$R^{32}$—$R^{33}$-$Rf^3$, or two $R^{31}$ together form —$R^{32}$—$R^{33}$-$Rf^4$-$R^{36}$—$R^{32}$—;

$R^{32}$ is each independently a single bond or —$(R^{37})_z$—;

$R^{37}$ is each independently alkylene having 1-6 carbon atoms, arylene having 6-10 carbon atoms, or —O—;

z is an integer of 1 to 3;

$R^{33}$ is —$CR^{34}$=$CR^{35}$— or —$CR^{34}X^3CHR^{35}$—;

$R^{36}$ is —$CR^{35}$=$CR^{34}$— or —$CHR^{35}CR^{34}X^3$—;

$R^{34}$ is each independently a hydrogen atom, an alkyl group having 1-3 carbon atoms, an ester group, a nitrile group, a nitro group, an alkoxy group having 1-3 carbon atoms, or an aryloxy group;

$R^{35}$ is each independently a hydrogen atom, an alkyl group having 1-3 carbon atoms, an ester group, a nitrile group, a nitro group, an alkoxy group having 1-3 carbon atoms, or an aryloxy group;

$X^3$ is each independently a hydrogen atom, an iodine atom, a bromine atom, or a chlorine atom;

$Rf^3$ is each independently a fluorine-containing alkyl group;

$Rf^4$ is each independently a fluorine-containing alkylene group; and m is an arbitrary number is crosslinked by a crosslinking agent containing a -$Rf^7$- group wherein $Rf^7$ is each independently a fluorine-containing alkylene group.

The silsesquioxane derivative of formula (II) constituting the crosslinked fluorine-containing and silicon-containing compound may or may not contain $Rf^3$ and $Rf^4$.

At least one $R^{31}$ in the silsesquioxane derivative of formula (II) constituting the crosslinked fluorine-containing and silicon-containing compound is an optionally substituted alkenyl group having 2-11 carbon atoms, preferably 2-8 carbon atoms, more preferably 2-6 carbon atoms, a vinyl group, a vinyloxy group, or a vinylalkyl group having 3-11 carbon atoms, preferably 3-8 carbon atoms, more preferably 3-6. Preferably, at least one $R^{31}$ is a vinyl group or a vinylalkyl group having 3-11 carbon atoms, preferably 3-8 carbon atoms, more preferably 3-6 carbon atoms. A carbon-carbon double bond in $R^{31}$ reacts with the crosslinking agent.

In one embodiment, in the crosslinked fluorine-containing and silicon-containing compound, a Si atom in a certain silsesquioxane derivative molecule and a Si atom in another silsesquioxane derivative molecule are bonded by —$R^{42}$—$R^{43}$-$Rf^7$-$R^{46}$—$R^{42}$—.

$R^{42}$ is each independently a single bond or —$(R^{47})_{z'}$—.

$R^{47}$ is each independently alkylene having 1-6 carbon atoms (preferably alkylene having 1-3 carbon atoms), arylene having 6-10 carbon atoms, or —O—.

z' is an integer of 1 to 3.

Examples of $R^{47}$ include, for example, alkylene, phenylene, -alkylene-phenylene-, -phenylene-alkylene-, —O-alkylene-, —O-phenylene-, —O-alkylene-phenylene-, —O-phenylene-alkylene-, -alkylene-O—, -phenylene-O—, -alkylene-phenylene-O—, or -phenylene-alkylene-O—. The alkylene is preferably alkylene having 1-3 carbon atoms, more preferably methylene.

$R^{43}$ is —$CR^{44}$=$CR^{45}$— or —$CR^{44}X^5CHR^{45}$—.

In one embodiment, $R^{43}$ is —$CR^{44}$=$CR^{45}$—.

In another embodiment, $R^{43}$ is —$CR^{44}X^5CHR^{45}$—.

$R^{46}$ is —$CR^{45}$=$CR^{44}$— or —$CHR^{45}CR^{44}X^5$—.

In one embodiment, $R^{46}$ is —$CR^{45}$=$CR^{44}$—.

In another embodiment, $R^{46}$ is —$CHR^{45}CR^{44}X^5$—.

$R^{44}$ is each independently a hydrogen atom or an alkyl group having 1-3 carbon atoms (preferably a methyl group) and is preferably a hydrogen atom.

$R^{45}$ is each independently a hydrogen atom or an alkyl group having 1-3 carbon atoms (preferably a methyl group) and is preferably a hydrogen atom.

In one embodiment, at least one of $R^{44}$ and $R^{45}$ is a hydrogen atom.

$X^5$ is each independently a hydrogen atom, an iodine atom, a bromine atom, or a chlorine atom, preferably an iodine atom, a bromine atom, or a chlorine atom, more preferably an iodine atom or a bromine atom, further preferably an iodine atom.

$Rf^7$ is each independently a fluorine-containing alkylene group. The fluorine-containing alkylene group is as defined for the fluorine-containing alkylene group in $Rf^2$ described above. Such fluorine-containing alkylene group may be straight or branched and may have one or more substituents.

The average molecular weight of the crosslinked fluorine-containing and silicon-containing compound is not particularly limited and can appropriately be set depending on a purpose such as use. For example, in one embodiment, the weight average molecular weight of the crosslinked fluorine-containing and silicon-containing compound is $5 \times 10^2$ to $5 \times 10^5$, preferably $5 \times 10^2$ to $1 \times 10^5$, and particularly preferably $1 \times 10^3$ to $3 \times 10^4$.

The crosslinked fluorine-containing and silicon-containing compound can be obtained by an addition reaction of a crosslinking agent of the following formula having $Rf^7$:

$$X^5\text{-}Rf^7\text{-}X^5$$

with —$(R^{31}SiO_{1.5})_m$—.

The addition reaction can be performed as in the method of producing the compound of formula (II) described above.

In one embodiment, the present invention provides a compound of formula (I), formula (I-1), formula (I-2), formula (I-2a), formula (I-2b), or formula (II) wherein two carbon atoms of the main chain of $R^3$, $R^4$, $R^{12}$, $R^{33}$, $R^{36}$, $R^{43}$, or $R^{46}$ are bonded by a carbon-carbon double bond, or a compound obtained by reducing the carbon-carbon double bond of the crosslinked fluorine-containing and silicon-containing compound into a carbon-carbon single bond.

In one embodiment, the present invention provides a fluorine-containing and silicon-containing compound of formula (Ia):

$$T^1\text{-}(A\text{-}B)_n\text{-}T^2$$

wherein:

A is each independently at each occurrence —$R^3$—$R^2$—$R^1$—$R^2$—$R^4$—;

$R^1$ is —$(SiR^7R^8$—$O)_p$—$SiR^7R^8$—;

$R^7$ is independently at each occurrence a hydrogen atom, an optionally substituted alkyl group having 1-8 carbon atoms, an optionally substituted alkenyl group having 1-8 carbon atoms, an optionally substituted aryl group, a vinyl group, a vinyloxy group, or a vinylalkyl group having 3-8 carbon atoms;

$R^8$ is independently at each occurrence a hydrogen atom, an optionally substituted alkyl group having 1-8 carbon atoms, an optionally substituted alkenyl group having 1-8 carbon atoms, an optionally substituted aryl group, a vinyl group, a vinyloxy group, a vinylalkyl group having 3-8 carbon atoms, or —$R^{11}$—$R^{12}$-$Rf^1$;

$R^{11}$ is a single bond or —$(R^{25})_x$—;

$R^{25}$ is each independently alkylene having 1-6 carbon atoms, arylene having 6-10 carbon atoms, or —O—;

x is an integer of 1 to 3;

$R^{12}$ is —$CHR^{13}CHR^{14}$—;

$R^{13}$ is each independently a hydrogen atom, an alkyl group having 1-3 carbon atoms, an ester group, a nitrile group, a nitro group, an alkoxy group having 1-3 carbon atoms, or an aryloxy group;

$R^{14}$ is each independently a hydrogen atom, an alkyl group having 1-3 carbon atoms, an ester group, a nitrile group, a nitro group, an alkoxy group having 1-3 carbon atoms, or an aryloxy group;

$X^2$ is each independently a hydrogen atom, an iodine atom, a bromine atom, or a chlorine atom;

$Rf^1$ is each independently a fluorine-containing alkyl group;

p is an integer of 0 to 50;

$R^2$ is each independently a single bond or —$(R^{26})_y$—;

$R^{26}$ is each independently alkylene having 1-6 carbon atoms, arylene having 6-10 carbon atoms, or —O—;

y is an integer of 1 to 3;

$R^3$ is a single bond, —$CHR^5CHR^6$—;

$R^4$ is a single bond, —$CHR^6CHR^5$—;

$R^5$ is each independently a hydrogen atom, an alkyl group having 1-3 carbon atoms, an ester group, a nitrile group, a nitro group, an alkoxy group having 1-3 carbon atoms, or an aryloxy group;

$R^6$ is each independently a hydrogen atom, an alkyl group having 1-3 carbon atoms, an ester group, a nitrile group, a nitro group, an alkoxy group having 1-3 carbon atoms, or an aryloxy group;

$X^1$ is each independently a hydrogen atom, an iodine atom, a bromine atom, or a chlorine atom;

B is independently at each occurrence a single bond or -$Rf^2$-;

$Rf^2$ is each independently a fluorine-containing alkylene group;

n is any integer; and $T^1$ and $T^2$ are each independently an end group.

In another embodiment, the present invention provides a fluorine-containing and silicon-containing compound which is a silsesquioxane derivative of formula (IIa):

—$(R^{31}SiO_{1.5})_m$— wherein:

$R^{31}$ is independently at each occurrence a hydrogen atom, an optionally substituted alkyl group having 1-11 carbon atoms, preferably 1-8 carbon atoms, more preferably 1-6 carbon atoms, an optionally substituted alkenyl group having 2-11 carbon atoms, preferably the carbon number of 2 to 8, more preferably 2-6 carbon atoms, an optionally substituted aryl group, a vinyl group, a vinyloxy group, a vinylalkyl group having 3-11 carbon atoms, preferably 3-8 carbon atoms, more preferably the carbon number of 3 to 6, or —$R^{32}$—$R^{33}$-$Rf^3$, or two $R^{31}$s together forming —$R^{32}$—$R^{33}$-$Rf^4$-$R^{36}$—$R^{32}$—;

$R^{32}$ is each independently a single bond or —$(R^{37})_z$—;

$R^{37}$ is each independently alkylene having 1-6 carbon atoms, arylene having 6-10 carbon atoms, or —O—;

z is an integer of 1 to 3;

$R^{33}$ is —$CHR^{34}CHR^{35}$—;

$R^{36}$ is —$CR^{35}$=$CR^{34}$— or —$CHR^{35}CR^{34}X^3$—;

$R^{34}$ is each independently a hydrogen atom, an alkyl group having 1-3 carbon atoms, an ester group, a nitrile group, a nitro group, an alkoxy group having 1-3 carbon atoms, or an aryloxy group;

$R^{35}$ is each independently a hydrogen atom, an alkyl group having 1-3 carbon atoms, an ester group, a nitrile group, a nitro group, an alkoxy group having 1-3 carbon atoms, or an aryloxy group;

$X^3$ is each independently a hydrogen atom, an iodine atom, a bromine atom, or a chlorine atom;

$Rf^3$ is each independently a fluorine-containing alkyl group;

$Rf^4$ is each independently a fluorine-containing alkylene group;

in the formula, at least one $Rf^3$ or $Rf^4$ is present; and m is an arbitrary number.

In another embodiment, the present invention provides a compound wherein a Si atom of one silsesquioxane derivative of formula (IIα):

—$(R^{31}SiO_{1.5})_m$— wherein $R^{31}$ and m are as defined above and a Si atom of another silsesquioxane derivative of formula (IIα) is cross-linked by a group of the following formula:

—$R^{42}$—$R^{43}$-$Rf^7$-$R^{46}$—$R^{42}$— wherein:

$R^{42}$ is each independently a single bond or —$(R^{47})_{z'}$—;

$R^{47}$ is each independently alkylene having 1-6 carbon atoms, arylene having 6-10 carbon atoms, or —O—;

z' is an integer of 1 to 3;

$R^{43}$ is —$CR^{44}$=$CR^{45}$—;

$R^{46}$ is —$CR^{45}$=$CR^{44}$—;

$R^{44}$ is each independently a hydrogen atom or an alkyl group having 1-3 carbon atoms;

$R^{45}$ is each independently a hydrogen atom or an alkyl group having 1-3 carbon atoms;

$X^5$ is each independently a hydrogen atom, an iodine atom, a bromine atom, or a chlorine atom; and $Rf^7$ is each independently a fluorine-containing alkylene group.

In one embodiment, the present invention provides a compound obtained by a hydrosilylation reaction of a compound of formula (I), formula (I-1), formula (I-2), formula (I-2a), formula (I-2b), or formula (II) wherein two carbon atoms of the main chain of $R^3$, $R^4$, $R^{12}$, $R^{33}$, $R^{36}$, $R^{43}$, or $R^{46}$ are bonded by a carbon-carbon double bond or the cross-linked fluorine-containing and silicon-containing compound with $HSiR^{61}_3$ at the carbon-carbon double bond.

$R^{61}$ is each independently a hydrogen atom, an alkyl group having 1-6 carbon atoms, an alkoxy group, or an aryl group.

In one embodiment, the present invention provides a fluorine-containing and silicon-containing compound of formula (Iγ):

$T^1$-$(A$-$B)_n$-$T^2$ wherein:

A is each independently at each occurrence $-R^3-R^2-R^1-R^2-R^4-$;

$R^1$ is $-(SiR^7R^8-O)_p-SiR^7R^8-$;

$R^7$ is independently at each occurrence a hydrogen atom, an optionally substituted alkyl group having 1-8 carbon atoms, an optionally substituted aryl group, a vinyl group, or a vinylalkyl group having 3-8 carbon atoms;

$R^8$ is independently at each occurrence a hydrogen atom, an optionally substituted alkyl group having 1-8 carbon atoms, an optionally substituted aryl group, a vinyl group, a vinylalkyl group having 3-8 carbon atoms, or $-R^{11}-R^{12}-Rf^1$;

$R^{11}$ is a single bond or $-(R^{25})_x-$;

$R^{25}$ is each independently alkylene having 1-6 carbon atoms, arylene having 6-10 carbon atoms, or $-O-$;

x is an integer of 1 to 3;

$R^{12}$ is $-CHR^{13}C(SiR^{61}_3)R^{14}-$ or $-C(SiR^{61}_3)R^{13}CHR^{14}-$;

$R^{13}$ is each independently a hydrogen atom or an alkyl group having 1-3 carbon atoms;

$R^{14}$ is each independently a hydrogen atom or an alkyl group having 1-3 carbon atoms;

$x^2$ is each independently an iodine atom or a bromine atom;

$Rf^1$ is each independently a fluorine-containing alkyl group;

p is an integer of 0 to 50;

$R^2$ is each independently a single bond or $-(R^{26})_y-$;

$R^{26}$ is each independently alkylene having 1-6 carbon atoms, arylene having 6-10 carbon atoms, or $-O-$;

y is an integer of 1 to 3;

$R^3$ is a single bond, $-CHR^5C(SiR^{61}_3)R^6-$, or $-C(SiR^{61}_3)R^5CHR^6-$;

$R^4$ is a single bond, $-CHR^6C(SiR^{61}_3)R^5-$, or $-C(SiR^{61}_3)R^6CHR^5-$;

$R^5$ is each independently a hydrogen atom or an alkyl group having 1-3 carbon atoms;

$R^6$ is each independently a hydrogen atom or an alkyl group having 1-3 carbon atoms;

$X^1$ is each independently an iodine atom or a bromine atom;

B is independently at each occurrence a single bond or $-Rf^2-$;

$Rf^2$ is each independently a fluorine-containing alkylene group;

n is any integer; and $T^1$ and $T^2$ are each independently an end group.

In another embodiment, the present invention provides a fluorine-containing and silicon-containing compound which is a silsesquioxane derivative of formula (IIγ):

$$-(R^{31}SiO_{1.5})_m-$$

wherein:

$R^{31}$ is independently at each occurrence a hydrogen atom, an optionally substituted alkyl group having 1-11 carbon atoms, preferably 1-8 carbon atoms, more preferably 1-6 carbon atoms, an optionally substituted aryl group, a vinyl group, a vinylalkyl group having 3-11 carbon atoms, preferably 1-8 carbon atoms, more preferably 1-6 carbon atoms, or $-R^{32}-R^{33}-Rf^3$, or two $R^{31}$ together form $-R^{32}-R^{33}-Rf^4-R^{36}-R^{32}-$;

$R^{32}$ is each independently a single bond or $-(R^{37})_z-$;

$R^{37}$ is each independently alkylene having 1-6 carbon atoms, arylene having 6-10 carbon atoms, or $-O-$;

z is an integer of 1 to 3;

$R^{33}$ is $-CHR^{34}C(SiR^{61}_3)R^{35}-$ or $-C(SiR^{61}_3)R^{34}CHR^{35}-$;

$R^{36}$ is $-CHR^{36}C(SiR^{61}_3)R^{34}-$ or $-C(SiR^{61}_3)R^{35}CHR^{34}-$;

$R^{34}$ is each independently a hydrogen atom or an alkyl group having 1-3 carbon atoms;

$R^{35}$ is each independently a hydrogen atom or an alkyl group having 1-3 carbon atoms;

$X^3$ is each independently an iodine atom or a bromine atom;

$Rf^3$ is each independently a fluorine-containing alkyl group;

at least one $Rf^3$ or $Rf^4$ is present in the formula; and m is an arbitrary number.

In another embodiment, the present invention provides a compound wherein a Si atom of one silsesquioxane derivative of formula (IIγ):

$$-(R^{31}SiO_{1.5})_m-$$

wherein $R^{31}$ and m are as defined above, and a Si atom of another silsesquioxane derivative of formula (IIα) is crosslinked by a group of the following formula:

$$\geq R^{42}-R^{43}-Rf^7-R^{46}-R^{42}-$$

wherein:

$R^{42}$ is each independently a single bond or $-(R^{47})_{z'}-$;

$R^{47}$ is each independently alkylene having 1-6 carbon atoms, arylene having 6-10 carbon atoms, or $-O-$;

z' is an integer of 1 to 3;

$R^{43}$ is $-CHR^{34}C(SiR^{61}_3)R^{35}-$ or $-C(SiR^{61}_3)R^{34}CHR^{36}-$;

$R^{46}$ is $-CHR^{35}C(SiR^{61}_3)R^{34}-$ or $-C(SiR^{61}_3)R^{36}CHR^{34}-$;

$R^{44}$ is each independently a hydrogen atom or an alkyl group having 1-3 carbon atoms;

$R^{45}$ is each independently a hydrogen atom or an alkyl group having 1-3 carbon atoms;

$X^5$ is each independently a hydrogen atom, an iodine atom, a bromine atom, or a chlorine atom; and $Rf^7$ is each independently a fluorine-containing alkylene group.

In one embodiment, the present invention provides a compound obtained by crosslinking at least two compounds of the compounds of formula (I), formula (I-1), formula (I-2), formula (I-2a), formula (I-2b), or formula (II) wherein two carbon atoms of the main chain of $R^3$, $R^4$, $R^{12}$, $R^{33}$, $R^{36}$, $R^{43}$, or $R^{46}$ are bonded by a carbon-carbon double bond, or the crosslinked fluorine-containing and silicon-containing compound, through a hydrosilylation reaction with a crosslinking agent having an H—Si bond at the carbon-carbon double bond.

The crosslinking agent is an organohydrogenpolysiloxane containing at least two hydrogen atoms bonded to silicon atoms in one molecule. The crosslinking agent may be straight, branched, or cyclic.

Examples of the crosslinking agent include: a diorganopolysiloxane blocked with a dimethylhydrogensilyl group; a copolymer of a dimethylsiloxane unit, a methylhydrogensiloxane unit, and a terminal trimethylsiloxane unit; a low viscosity fluid composed of a dimethylhydrogensiloxane unit and a $SiO_2$ unit; 1,3,5,7-tetrahydrogen-1,3,5,7-tetramethylcyclotetrasiloxane; 1-propyl-3,5,7-trihydrogen-1,3,5,7-tetramethylcyclotetrasiloxane; and 1,5-dihydrogen-3,7-dihexyl-1,3,5,7-tetramethylcyclotetrasiloxane.

The content of the crosslinking agent in the polymer is such that the number of hydrogen atoms bonded to silicon atoms is 0.5 to 20.0, preferably 1.0 to 5.0, per one internal olefin skeleton in the polymer.

The fluorine-containing and silicon-containing compound of the present invention is used for various applications. Particularly, the fluorine-containing and silicon-containing compound of the present invention having multiple reaction points (i.e., double bonds or halogen atoms) derived from —CR$^5$=CR$^6$—, —CHR$^5$CR$^6$X$^1$—, —CR$^{13}$=CR$^{14}$—, or —CR$^{13}$X$^2$CHR$^{14}$— can be used for various applications utilizing these reaction points. Although not particularly limited, specific applications include, for example, additives, crosslinking agents, liquid rubber materials, hard coating agents, coating materials, and curable materials.

The present invention provides a composition containing the fluorine-containing and silicon-containing compound of formula (I) or formula (II) of the present invention, or the crosslinked fluorine-containing and silicon-containing compound of the present invention.

In one embodiment, the present invention provides a composition containing the fluorine-containing silicon compound which is a silsesquioxane derivative of formula (II), preferably the compound of a random type or a cage type, more preferably the compound of a cage type.

In one embodiment, the composition of the present invention may contain an organic solvent. The organic solvent is not particularly limited and is preferably a fluorine-containing solvent.

Although not particularly limited, examples of the fluorine-containing solvent include AsahiKlin (registered trademark) AK-225 (manufactured by Asahi Glass), $C_2F_5CF(OCH_3)C_3F_7$, $ClCF_2$—$CFCl$—$CF_2CF_3$, etc.

In one embodiment, the composition of the present invention may further contain other components. Although not particularly limited, examples of the other components include dispersion stabilizers, emulsifiers, curing agents, photoacid generators, photo-radical generators, fillers (e.g., silica particles, metal oxide particles), etc.

In one embodiment, the compound or composition of the present invention is used as a crosslinking agent or an additive.

In one preferable embodiment, the compound or composition of the present invention is used as a crosslinking agent for rubber materials such as fluororubber, perfluoro rubber, and silicone rubber. Therefore, the present invention provides a rubber material crosslinked by the compound of the present invention, for example, fluororubber, perfluoro rubber, or silicone rubber.

In another preferable embodiment, the compound or composition of the present invention is used as an additive for rubber materials such as fluororubber, perfluoro rubber, and silicone rubber. Thus, the present invention provides a rubber composition containing the compound of the present invention and the rubber material, for example, fluororubber, perfluoro rubber, or silicone rubber.

An addition amount of the compound of the present invention can appropriately be changed depending on an intended use, a purpose, etc. For example, the addition amount may be 0.1 mass % or more, preferably 1 mass % or more, more preferably 5 mass % or more, further preferably 10 mass % or more, for example, 15 mass % or more or 20 mass % or more for a rubber material. The addition amount may be 50 mass % or less, preferably 30 mass % or less for a rubber material. In one embodiment, the addition amount of the compound of the present invention may be 0.1 to 50 mass %, preferably 1 to 30 mass %, particularly preferably 5 to 30 mass %, for example 5.0 to 10 mass %, 5.0 to 15.0 mass %, 5.0 to 20.0 mass %, or 5.0 to 30.0 mass %.

When the compound of the present invention is added to a rubber material, performance of the rubber material such as heat resistance and oxygen plasma resistance can be improved. Particularly, by increasing the addition amount of the compound of the present invention, the performance of the rubber material can further be improved. By decreasing the addition amount of the compound of the present invention, an original function of the rubber material can be retained.

In one embodiment, when the composition of the present invention is used as a crosslinking agent or an additive of a rubber material, preferably, the composition of the present invention may contain an organic solvent, preferably a fluorine-containing solvent. In this embodiment, an amount of the organic solvent contained in the composition of the present invention may be 1 to 100 parts by mass, preferably 1.5 to 10 parts by mass, based on 1 part by mass of the rubber material.

The fluororubber may be either non-perfluoro fluororubber or perfluoro fluororubber.

For example, the fluororubber preferably contains a structural unit derived from at least one monomer selected from the group consisting of tetrafluoroethylene (TFE), vinylidene fluoride (VdF), and perfluoroethylenically unsaturated compounds (e.g., hexafluoropropylene (HFP), perfluoro (alkyl vinyl ether) (PAVE)) of formula (a):

$$CF_2=CF-Rf^a \qquad (a)$$

wherein $Rf^a$ is —$CF_3$ or $ORf^b$ wherein $Rf^b$ represents a perfluoroalkyl group having the carbon number of 1 to 5.

Examples of the non-perfluoro fluororubber include vinylidene fluoride (VdF) based fluororubber, tetrafluoroethylene (TFE)/propylene (Pr) based fluororubber, tetrafluoroethylene (TFE)/propylene (Pr)/vinylidene fluoride (VdF) based fluororubber, ethylene (Et)/hexafluoropropylene (HFP) based fluororubber, ethylene (Et)/hexafluoropropylene (HFP)/vinylidene fluoride (VdF) based fluororubber, ethylene (Et)/hexafluoropropylene (HFP)/tetrafluoroethylene (TFE) based fluororubber, fluorosilicone-based fluororubber, and fluorophosphazene-based fluororubber, which may be used alone or in combination. These fluororubbers may be copolymers with comonomers.

The comonomers are not particularly limited as long as the comonomers can copolymerize with other monomers, and examples thereof include fluorine-containing monomers (c) such as TFE, HFP, PAVE, chlorotrifluoroethylene (CTFE), trifluoroethylene, trifluoropropylene, tetrafluoropropylene, pentafluoropropylene, trifluorobutene, tetrafluoroisobutene, hexafluoroisobutene, vinyl fluoride, iodine-containing fluorinated vinyl ether, a fluorine-containing monomer of formula (b):

$$CH_2=CFRf^b \qquad (b)$$

wherein $Rf^b$ represents a straight or branched fluoroalkyl group having the carbon number of 1 to 12;

perfluoro vinyl ether represented by

$$CF_2=CFOCF_2ORf^c \qquad (c)$$

wherein $Rf^c$ represents a straight or branched perfluoroalkyl group having 1-6 carbon atoms, a cyclic perfluoroalkyl group having the carbon number of 5 to 6, or a straight or branched perfluorooxyalkyl group having 2-6 carbon atoms containing 1 to 3 oxygen atoms;

fluorine-free monomers such as ethylene (Et), propylene (Pr), and alkyl vinyl ether; and reactive emulsifiers, which may be used alone or in combination of two or more thereof.

Examples of such a copolymer include, but not limited to, at least one copolymer selected from the group consisting of VdF/HFP copolymers, VdF/TFE/HFP copolymers, VdF/CTFE copolymers, VdF/CTFE/TFE copolymers, VdF/TFE/PAVE copolymers, VdF/TFE/PAVE copolymers, VdF/HFP/PAVE copolymers, VdF/HFP/TFE/PAVE copolymers, VdF/TFE/propylene (Pr) copolymers, VdF/ethylene (Et)/HFP copolymers, and copolymers of VdF/fluorine-containing monomer (b) of formula (b).

A reactive site of the fluororubber with the compound of the present invention may be derived from the monomer having the reactive site or may be introduced as a reactive site with the compound of the present invention by modifying a fluororubber having no reactive site.

Examples of the monomer having a reactive site with the compound of the present invention include a bisolefin compound, for example, a bisolefin compound of formula: $R^{42}R^{43}C=CR^{44}-Z-CR^{45}=CR^{46}R^{47}$ wherein $R^{42}$, $R^{43}$, $R^{44}$, $R^{45}$, $R^{46}$, and $R^{47}$ may be the same or different and independently represent a hydrogen atom or an alkyl group having the carbon number of 1 to 5; and Z represents a straight or branched alkylene or cycloalkylene group having 1-18 carbon atoms preferably at least partially fluorinated and optionally containing an oxygen atom, or a (per)fluoropolyoxyalkylene group.

Another example of the monomer having a reactive site with the compound of the present invention is a compound having a —$CF_2$—I—, —$CF_2$—Br, or —$CF_2$—$CH_2$—I group, for example, formulae: I-Rf-I, Br-Rf-Br, I—$CH_2$-Rf-$CH_2$—I, I—$CH_2CH_2$-Rf-$CH_2CH_2$—I wherein Rf is a divalent perfluoroalkylene group or a divalent perfluoropolyalkylether group, e.g., $C_2F_4$, $C_4F_8$, $C_6F_{12}$, $C_8F_{16}$, $C_{10}F_{20}$.

In one embodiment, the fluororubber may be a fluororubber used for a sealing material such as an O-ring, for example, vinylidene fluoride based (FKM) fluororubber, tetrafluoroethylene-propylene based (FEPM) fluororubber, and tetrafluoroethylene-perfluorovinylether based (FFKM) fluororubber.

From the viewpoint of excellent compression permanent set characteristics at high temperature, the fluorine-containing rubber preferably has a glass transition temperature of −70° C. or higher, more preferably −60° C. or higher, and further preferably −50° C. or higher. From the viewpoint of favorable cold resistance, the glass transition temperature is preferably 5° C. or less, more preferably 0° C. or less, and further preferably −3° C. or less.

The glass transition temperature can be obtained by acquiring a DSC curve by raising a temperature of 10 mg of a sample at 10° C./min by using a differential scanning calorimeter (DSC822e, manufactured by Mettler Toledo), as a temperature indicative of the midpoint of two intersections of extended lines of baselines before and after a second transition of the DSC curve and a tangential line at the inflection point of the DSC curve.

From the viewpoint of favorable heat resistance, the fluorine-containing rubber preferably has a Mooney viscosity ML (1+20) at 170° C. of 30 or more, more preferably 40 or more, further preferably 50 or more. From the viewpoint of favorable processability, the Mooney viscosity is preferably 150 or less, more preferably 120 or less, and further preferably 110 or less.

From the viewpoint of favorable heat resistance, the fluorine-containing rubber preferably has a Mooney viscosity ML (1+20) at 140° C. of 30 or more, more preferably 40 or more, further preferably 50 or more. From the viewpoint of favorable processability, the Mooney viscosity is 180 or less, more preferably 150 or less, and further preferably 110 or less.

From the viewpoint of favorable heat resistance, the fluorine-containing rubber preferably has a Mooney viscosity ML (1+20) at 100° C. of 10 or more, more preferably 20 or more, further preferably 30 or more. From the viewpoint of favorable processability, the Mooney viscosity is preferably 120 or less, more preferably 100 or less, and further preferably 80 or less.

The Mooney viscosity can be measured according to JIS K6300 at 170° C., 140° C., or 100° C. by using Mooney viscometer MV2000E model manufactured by ALPHA TECHNOLOGIES.

Preferably, the composition further contains another crosslinking agent. Examples of the other crosslinking agent include crosslinking agents used in peroxide crosslinking, polyol crosslinking, polyamine crosslinking, triazine crosslinking, oxazole crosslinking, imidazole crosslinking, and thiazole crosslinking.

The crosslinking agent used in the peroxide crosslinking may be any organic peroxide capable of easily generating peroxy radicals in the presence of heat or an oxidation-reduction system, and specific examples include 1,1-bis(t-butylperoxy)-3,5,5-trimethylcyclohexane, 2,5-dimethyl-hexane-2,5-dihydroperoxide, di-t-butylperoxide, t-butyl cumyl peroxide, dicumyl peroxide, α,α-bis (t-butylperoxy)-p-diisopropylbenzene, 2,5-dimethyl-2,5-di(t-butylperoxy) hexane, 2,5-dimethyl-2,5-di(t-butylperoxy)-hexyne-3, benzoyl peroxide, t-butylperoxybenzene, 2,5-dimethyl-2,5-di(benzoylperoxy)hexane, t-butylperoxy maleic acid, t-butylperoxy isopropyl carbonate. A type and an amount of organic peroxide are generally selected in consideration of an amount of active —O—O—, decomposition temperature, etc.

A crosslinking aid usable in this case may be a compound having a reaction activity to peroxy radicals and polymer radicals, and examples thereof include polyfunctional compounds having a functional group such as $CH_2=CH-$, $CH_2=CHCH_2-$, and $CF_2=CF-$. Specific examples thereof include triallyl cyanurate, triallyl isocyanurate (TRIC), triacryl formal, triallyl trimellitate, N,N'-n-phenylene bismaleimide, dipropargyl terephthalate, diallyl phthalate, tetraallyl Terephthalate amide, triallyl phosphate, bismaleimide, fluorinated triallyl isocyanurate (1,3,5-tris(2,3,3-trifluoro-2-propenyl)-1,3,5-triazine 2,4,6-trione), tris(diallylamine)-S-triazine, triallyl phosphite, N,N-diallylacrylamide, 1,6-divinyldodecafluorohexane etc.

Examples of the crosslinking agent used for the polyol crosslinking include polyhydric alcohol compounds such as bisphenol A and bisphenol AF.

Examples of the crosslinking agent used for the polyamine crosslinking include polyvalent amine compounds such as hexamethylenediamine carbamate, N,N'-dicinnamylidene-1,6-hexanediamine, and 4,4'-bis(aminocyclohexyl)methane carbamate.

Examples of the crosslinking agent used for the triazine crosslinking include organotin compounds such as tetraphenyltin and triphenyltin.

Examples of the crosslinking agent used for the oxazole crosslinking system, the imidazole crosslinking system, and the thiazole crosslinking system include a bisdiaminophenyl-based crosslinking agent of formula (20):

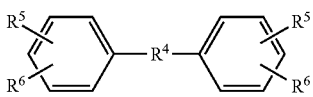
(20)

wherein R$^4$ represents —SO$_2$—, —O—, —CO—, an alkylene group having 1-6 carbon atoms, a perfluoroalkylene group having 1-10 carbon atoms, or a single bonding hand, or a group of a formula:

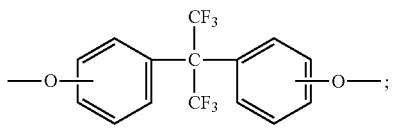

one of R$^5$ and R$^6$ is —NH$_2$ and the other is —NHR$^7$, —NH$_2$, —OH, or —SH; R$^7$ is a hydrogen atom, a fluorine atom, or a monovalent organic group; and preferably R$^5$ is —NH$_2$ while R$^6$ is —NHR$^7$; preferable specific examples of the alkylene group having 1-6 carbon atoms include a methylene group, an ethylene group, a propylene group, a butylene group, a pentylene group, a hexylene group, and examples of the perfluoroalkylene group having 1-10 carbon atoms include

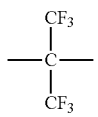

etc.; and these compounds are known as examples of bis-diaminophenyl compounds in Japanese Examined Patent Application Publication No. 2-59177, Japanese Laid-Open Patent Publication No. 8-120146, etc., a bisaminophenol-based crosslinking agent, a bisaminothiophenol-based crosslinking agent, a bisamidrazone-based crosslinking agent of formula (21):

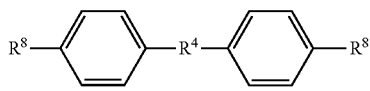
(21)

wherein R$^4$ is the same as described above; and R$^8$ is a group of:

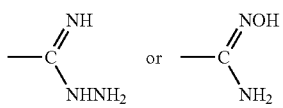

a bis-amide-oxime-based crosslinking agent of formula (22):

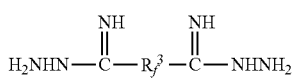
(22)

wherein R$_f^3$ is a perfluoroalkylene group having 1-10 carbon atoms, or formula (23):

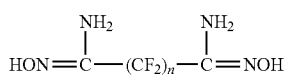
(23)

wherein n is an integer of 1 to 10, etc.

Although these bisaminophenol-based crosslinking agents, bisaminothiophenol-based crosslinking agents, or bisdiaminophenyl type crosslinking agents etc. are conventionally used for a crosslinking system having a cyano group as a crosslinking point, the crosslinking agents also react with a carboxyl group and an alkoxycarbonyl group to form an oxazole ring, a thiazole ring, an imidazole ring and provide a crosslinked product.

Particularly preferred crosslinking agents include a compound having multiple 3-amino-4-hydroxyphenyl groups or 3-amino-4-mercaptophenyl groups, or compounds of formula (24):

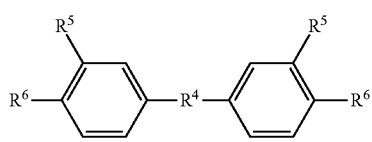
(24)

wherein R$^4$, R$^5$, R$^6$ are the same as described above, and specific examples include 2,2-bis(3-amino-4-hydroxyphenyl)hexafluoropropane (generic name: bis(aminophenol) AF), 2,2-bis(3-amino-4-mercaptophenyl)hexafluoropropane, tetraaminobenzene, bis-3,4-diaminophenylmethane, bis-3,4-diaminophenyl ether, 2,2-bis(3,4-diaminophenyl) hexafluoropropane, 2,2-bis[3-amino-4-(N-phenylamino)phenyl]hexafluoropropane, 2,2-bis[3-amino-4-(N-methylamino)phenyl]hexafluoropropane, 2,2-bis[3-amino-4-(N-ethylamino)phenyl]hexafluoropropane, 2,2-bis[3-amino-4-(N-propylamino)phenyl]hexafluoropropane, 2,2-bis[3-amino-4-(N-perfluorophenylamino)phenyl]hexafluoropropane, 2,2-bis[3-amino-4-(N-benzylamino)phenyl]hexafluoropropane, etc.

Among them, from the viewpoints of heat resistance, steam resistance, amine resistance, and favorable crosslinking property, the other crosslinking agent is preferably 2,2-bis[3-amino-4-(N-phenylamino)phenyl]hexafluoropropane.

Based on 100 parts by mass of a fluorine-containing polymer, the other crosslinking agent is preferably 0.05 to 10 parts by mass, more preferably 0.5 to 5 parts by mass. If the crosslinking agent is less than 0.05 parts by mass, the fluoropolymer tends to be insufficiently crosslinked, and the crosslinking agent exceeding 10 parts by mass tends to deteriorate the physical properties of the crosslinked product.

In one embodiment, the composition of the present invention is used as a raw material of a liquid rubber. Since the compound of the present invention has a —Si—O— bond in a molecule and the molecule is soft, the compound may be suitable for a raw material for a liquid rubber.

The composition of the present invention (hereinafter also referred to as a "liquid rubber raw material composition 1") used as a raw material for liquid rubber contains at least one compound (I) of the present invention described above.

When the liquid rubber raw material composition 1 is mixed with a composition containing a compound having an unsaturated bond (hereinafter also referred to as a "liquid rubber raw material composition 2"), the carbon-halogen bond or the olefin skeleton contained in the compound of the present invention reacts with unsaturated bond or the carbon-halogen bond or the hydrogen-silicon bond contained in the compound in the liquid rubber raw material composition 2 to form a gel-like product (i.e., a liquid rubber).

Examples of the compound having an unsaturated bond contained in the liquid rubber raw material composition 2 include, but not limited to, one or more compounds of formula:

CH$_2$=CH—(X)$_a$-Rf-(X)$_n$—CH=CH$_2$ wherein:
X is each independently —CH$_2$—, —CH$_2$O—, —CH$_2$OCH$_2$—, or —CH2-NR—CO—;
Y is —CH$_2$—:
Rf is a divalent perfluoroalkylene group or a divalent perfluoropolyalkyl ether group; and
a is each independently an integer of 0 or 1], and
one or more compounds of formula:

Rf-(X)$_n$—CH=CH$_2$ wherein:
X is each independently —CH$_2$—, —CH$_2$O—, —CH$_2$OCH$_2$—, or —CH$_2$—NR—CO—;
Y is —CH$_2$—;
Rf is a perfluoropolyalkyl group or a perfluoropolyalkyl ether group; and
a is each independently an integer of 0 or 1.

Specific examples of the compound having an unsaturated bond contained in the liquid rubber raw material composition 2 include triallyl isocyanurate (TRIC), triallyl trimellitate, diallyl phthalate, triallyl phosphite, N,N-diallyl acrylamide, 1,6-divinyldodecafluorohexane, bismaleimide, triallyl phosphate, etc.

Examples of the compound having the carbon-halogen bond contained in the liquid rubber raw material composition 2 include, but not limited to, one or more compounds of formula:

(Z)-Rf-(Z)

wherein:
Z is I, Br, I—CH$_2$—, or I—CH$_2$CH$_2$—;
Rf is a divalent perfluoroalkylene group or a divalent perfluoropolyalkyl ether group, and
one or more compounds of formula:

Rf-(Z)

wherein:
Z is I, Br, I—CH$_2$—, or I—CH$_2$CH$_2$—; and
Rf is a divalent perfluoroalkylene group or a divalent perfluoropolyalkyl ether group.

Examples of the compound having the hydrogen-silicon bond contained in the liquid rubber raw material composition 2 include, but not limited to, an organohydrogenpolysiloxane containing at least two hydrogen atoms bonded to silicon atoms in one molecule. The compound having the hydrogen-silicon bond may be straight, branched, or cyclic.

Examples of the compound having the hydrogen-silicon bond include: a diorganopolysiloxane blocked with a dimethylhydrogensilyl group; a copolymer of a dimethylsiloxane unit, a methylhydrogensiloxane unit, and a terminal trimethylsiloxane unit; a low viscosity fluid composed of a dimethylhydrogensiloxane unit and a SiO$_2$ unit; 1,3,5,7-tetrahydrogen-1,3,5,7-tetramethylcyclotetrasiloxane; 1-propyl-3,5,7-trihydrogen-1,3,5,7-tetramethylcyclotetrasiloxane; and 1,5-dihydrogen-3,7-dihexyl-1,3,5,7-tetramethylcyclotetrasiloxane.

The liquid rubber obtained by using the composition of the present invention can be designed to have a structure with a high content of fluoroalkyl chain skeletons as compared to conventional typical fluorine-containing silicone-based liquid rubber and is therefore advantageous in terms of heat resistance, oxidation resistance, plasma resistance, ozone resistance, oil resistance, etc.

The present invention also provides a liquid rubber manufactured by using the composition of the present invention.

Particularly, the compound of the present invention can be mixed with a rubber material or a raw material of the rubber material to impart various properties to the rubber material. For example, even when used for an application in which a material is exposed to oxygen plasma, a rubber material having the compound of the present invention added thereto hardly deteriorates and can suppress dropout etc. of the compound that may cause various problems. Even if the dropout occurs, the compound of the present invention has a molecular size so that an influence on surroundings can be reduced.

Although the present invention has been described in detail, the present invention is not limited to these compounds and applications.

EXAMPLES

Example 1

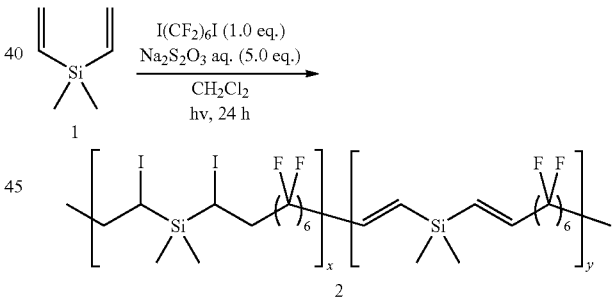

In a Pyrex tube, divinyldimethylsilane 1 (44.4 mg, 0.2 mmol) was dissolved in CH$_2$Cl$_2$ (4 ml), and I(CF$_2$)$_6$I (227.5 mg, 1.0 eq.) and a sodium thiosulfate aqueous solution (318.8 mg, 5.0 eq., 2 ml) were added before applying ultraviolet light for 12 hours by using a 450 W high-pressure mercury lamp with stirring while keeping the reaction system at constant temperature. Completion of the reaction was followed by reprecipitation to obtain a product 2b (158.5 mg, 65% yield, Mw=1.3×104, Mw/Mn=1.9).

$^1$H NMR (400 MHz, CDCl$_3$):

δ=6.72-6.68 (2H, m, 2C=CH, y), 6.22-6.12 (2H, m, 2CF$_2$CH, y), 3.53-3.46 (2H, m, 2ICH, x), 2.89-2.66 (4H, m, 2CF$_2$CHH, 2CF$_2$CHH, x), 0.43-0.38 (12H, m, 4SiCH$_3$, x, y), $^{19}$F NMR (376 MHz, CDCl$_3$):

δ=−113.6 to −116.5, −122.2, −124.2

Example 2

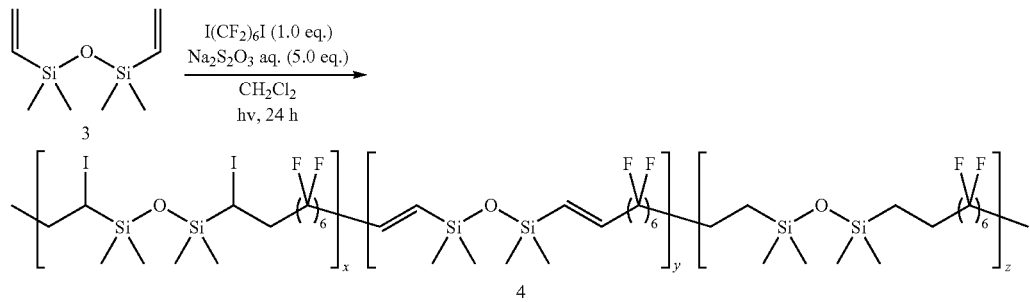

In a Pyrex tube, 1,3-divinyltetramethyldisiloxane 3 (75.2 mg, 0.4 mmol) was dissolved in $CH_2Cl_2$ (4 ml), and $I(CF_2)_6I$ (221.6 mg, 1.0 eq.), a sodium thiosulfate aqueous solution (314.5 mg, 5.0 eq., 2 ml) were added before applying ultraviolet light for 24 hours by using a 450 W high-pressure mercury lamp with stirring while keeping the reaction system at constant temperature. Completion of the reaction was followed by reprecipitation to obtain a product 4 (165.8 mg, 64% yield, Mw=1.4×104, Mw/Mn=3.1).

$^1$H NMR (400 MHz, $CDCl_3$):
δ=6.61-6.58 (2H, m, 2C=CH, y), 6.15-6.03 (2H, m, 2$CF_2CH$, y), 3.31-3.21 (2H, m, 2ICH, x), 2.86-2.66 (2H, m, 2$CF_2$CHH, x), 2.61-2.50 (2H, m, 2$CF_2$CHH, x), 2.12-1.93 (4H, m, 2$CF_2CH_2CH_2$, z), 0.81-0.77 (4H, m, 2$SiCH_2$, z), 0.13-0.38 (36H, m, 12$SiCH_3$, x, y, z)

$^{19}$F NMR (376 MHz, $CDCl_3$):
δ=−114.3 to −116.9, −122.3, −124.0

Example 3

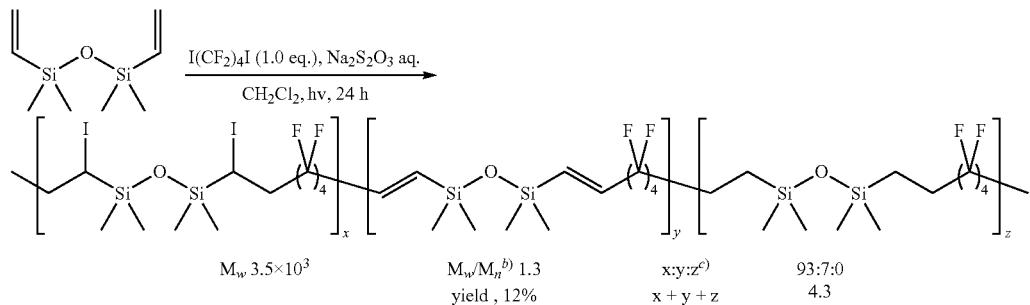

$M_w$ 3.5×10$^3$    $M_w/M_n^{b)}$ 1.3    x:y:z$^{c)}$    93:7:0
                    yield, 12%           x+y+z          4.3

In a Pyrex tube, 1,3-divinyltetramethyldisiloxane 3 (0.4 mmol) was dissolved in $CH_2Cl_2$ (4 ml), and $I(CF_2)_4I$ (1.0 eq.) and a sodium thiosulfate aqueous solution (5.0 eq.) were added before applying ultraviolet light for 24 hours by using a 450 W high-pressure mercury lamp with stirring while keeping the reaction system at constant temperature. Completion of the reaction was followed by reprecipitation to obtain an intended transparent oily polymer (12% yield, Mw=3.5×10$^3$, Mw/Mn=1.3).

$^1$H NMR (400 MHz, $CDCl_3$):
δ=6.61-6.58 (2H, m, 2C=CH), 6.15-6.03 (2H, m, 2$CF_2CH$), 3.31-3.21 (2H, m, 2ICH), 2.86-2.66 (2H, m, 2$CF_2$CHH), 2.61-2.50 (2H, m, 2$CF_2$CHH), 0.13-0.38 (24H, m, 8$SiCH_3$)

$^{19}$F NMR (376 MHz, $CDCl^3$):
δ=−114.3 to −116.9, −124.2

Example 4

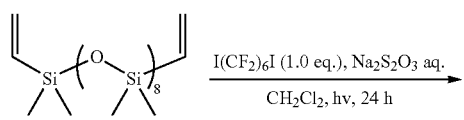

-continued

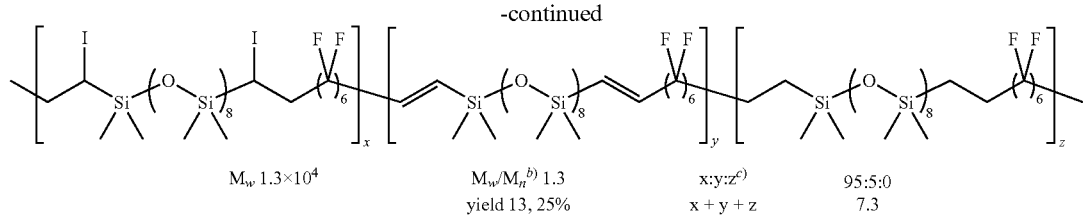

| $M_w$ $1.3 \times 10^4$ | $M_w/M_n^{b)}$ 1.3 yield 13, 25% | x:y:z$^{c)}$ x + y + z | 95:5:0 7.3 |

In a Pyrex tube, a siloxane type monomer (0.4 mmol) having a vinyl group at both ends in the formula was dissolved in $CH_2Cl_2$ (4 ml), and $I(CF_2)_6I$ (1.0 eq.) and a sodium thiosulfate aqueous solution (5.0 eq.) were added before applying ultraviolet light for 24 hours by using a 450 W high-pressure mercury lamp with stirring while keeping the reaction system at constant temperature. Completion of the reaction was followed by reprecipitation to obtain an intended transparent oily polymer (25% yield, Mw=$1.3 \times 10^4$, Mw/Mn=1.3).

$^1$H NMR (400 MHz, $CDCl_3$):

δ=6.66-6.61 (2H, m, 2C=CH), 6.18-6.06 (2H, m, 2CF$_2$CH), 3.20-3.17 (2H, m, 2ICH), 2.94-2.81 (2H, m, 2CF$_2$CHH), 2.61-2.45 (2H, m, 2CF$_2$CHH), 0.88-0.07 (54H, m, 18SiCH$_3$)

$^{19}$F NMR (376 MHz, $CDCl_3$):

δ=−113.6 to −116.5, −122.2, −124.3

Example 5

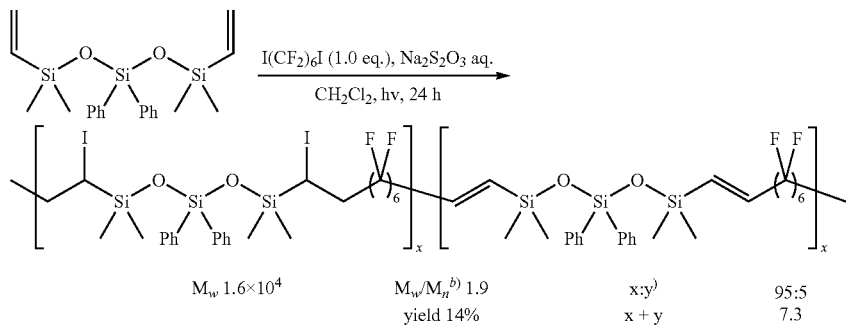

| $M_w$ $1.6 \times 10^4$ | $M_w/M_n^{b)}$ 1.9 yield 14% | x:y$^{)}$ x + y | 95:5 7.3 |

In a Pyrex tube, a siloxane type monomer (0.4 mmol) having a vinyl group at both ends in the formula was dissolved in $CH_2Cl_2$ (4 ml), and $I(CF_2)_6I$ (1.0 eq.) and a sodium thiosulfate aqueous solution (5.0 eq.) were added before applying ultraviolet light for 24 hours by using a 450 W high-pressure mercury lamp with stirring while keeping the reaction system at constant temperature. Completion of the reaction was followed by reprecipitation to obtain an intended transparent oily polymer (14% yield, Mw=$1.6 \times 10^4$, Mw/Mn=1.9).

$^1$H NMR (400 MHz, $CDCl_3$):

δ=7.5-7.3 (10H, $C_6H_5$), 3.15 (2H, d, CHI), 2.73 (2H, m, CF$_2$CHH), 2.41 (2H, m, HHCF$_2$CHH), 0.31 (12H, s, SiCH$_3$)

$^{19}$F NMR (376 MHz, $CDCl_3$):

δ=−115.5 (4F, $CH_2CF_2$), −122.3 (4F), −124.2 (4F)

Example 6

Scheme 7.

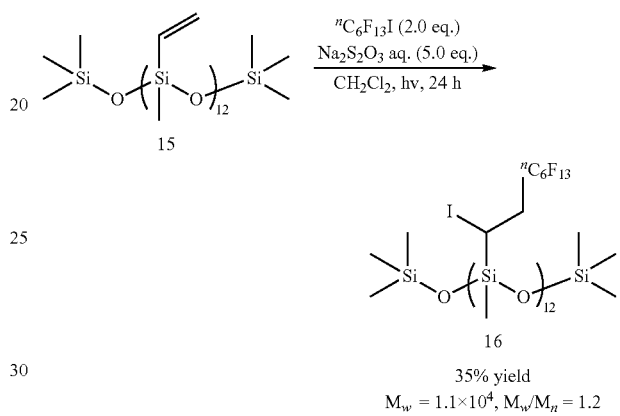

35% yield
$M_w = 1.1 \times 10^4$, $M_w/M_n = 1.2$

In a Pyrex tube, polyvinylsilicone (501.7 mg, 0.4 mmol) in the formula and $CF_3(CF_2)_5I$ (2 eq.) were dissolved in $CH_2Cl_2$ (4 ml), and a sodium thiosulfate aqueous solution (5.0 eq.) was added before applying ultraviolet light for 24 hours by using a 450 W high-pressure mercury lamp with stirring while keeping the reaction system at constant temperature. Completion of the reaction was followed by reprecipitation to obtain an intended transparent oily polymer (35% yield, Mw=$1.1 \times 10^4$, Mw/Mn=1.2).

$^1$H NMR (400 MHz, $CDCl_3$):

δ=3.26-3.06 (12H, m, 2ICH), 2.99-2.78 (12H, m, 2CF$_2$CHH), 2.73-2.45 (12H, m, 2CF$_2$CHH), 0.58-0.13 (18H, m, 9SiCH$_3$);

$^{19}$F NMR (376 MHz, $CDCl_3$):

δ=−81.5 (6F, s, 2CF$_3$), −115.2 (4F, m, 2CF$_2$), −122.4 (4F, s, 2CF$_2$), −123.5 (4F, s, 2CF$_2$), −124.1 (4F, s, 2CF$_2$), −126.8 (4F, s, 2CF$_2$);

$^{13}$C NMR (126 MHz, $CDCl_3$):

δ=120.96-119.69, 118.67-117.63, 116.39-115.59, 113.84-112.23, 111.38-110.06, 109.24-108.13, 34.79-34.49 ($CF_2C$), 1.51 (ICH), −2.72-3.74 ($SiCH_3$)

Example 7

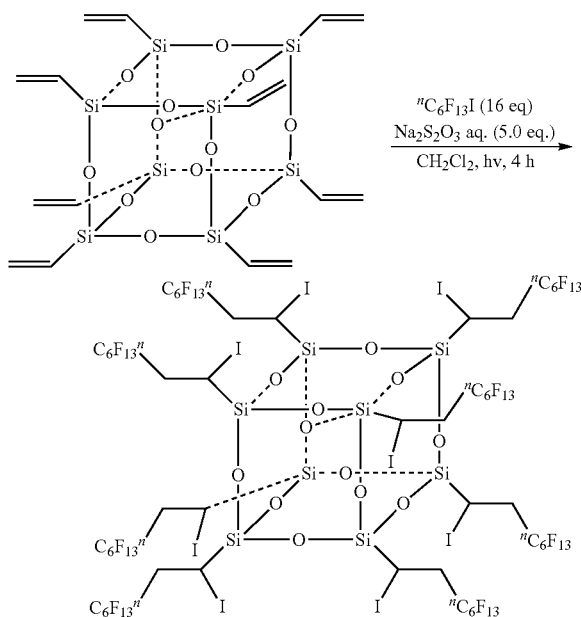

Equivalents are based on POSS Unit.

In a Pyrex tube, a polyhedral oligomeric silsesquioxane (hereinafter also referred to as "POSS") compound (63.6 mg, 0.100 mmol) in the formula having a vinyl group at each apex and $CF_3(CF_2)_5I$ (16 eq.) were dissolved in $CH_2Cl_2$ (4 ml), and a sodium thiosulfate aqueous solution (5.0 eq.) was added before applying ultraviolet light for 4 hours by using a 450 W high-pressure mercury lamp with stirring while keeping the reaction system at constant temperature. Completion of the reaction was followed by various purification operations to obtain an intended POSS compound (15% yield, 130 mg).

$^1$H NMR (400 MHz, $CDCl_3$):

δ 3.26 (1H, br, IH), 2.83 (2H, br, $C_6F_{13}CH_2$)

$^{19}$F NMR (376 MHz, $CDCl_3$):

δ=−81.5 (s, $CF_3$), −115.1 (d, $CF_2$), −122.4 (s, $CF_2$), −123.5 (s, $CF_2$), −124.1 (s, $CF_2$), −126.8 (s, $CF_2$)

Example 8

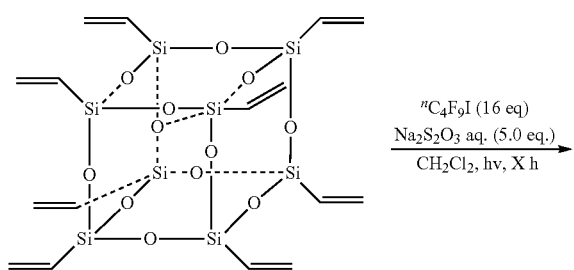

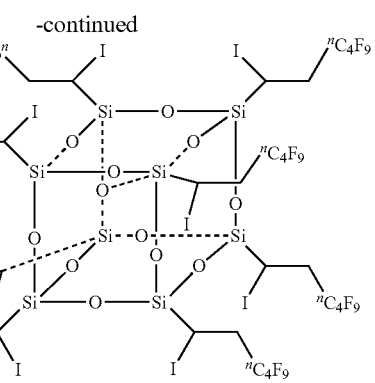

Equivalents are based on POSS Unit.

In a Pyrex tube, a POSS compound (63.6 mg, 0.100 mmol) in the formula having a vinyl group at each apex and $CF_3(CF_2)_3I$ (16 eq.) were dissolved in a mixed solvent of $CH_2Cl_2$ (2 mL) and AsahiKlin AK-225 (2 mL), and a sodium thiosulfate aqueous solution (5.0 eq.) was added before applying ultraviolet light for 4 hours by using a 450 W high-pressure mercury lamp with stirring while keeping the reaction system at constant temperature. Completion of the reaction was followed by various purification operations to obtain an intended POSS compound (30.5 mg).

$^1$H NMR (400 MHz, $CDCl_3$):

δ 3.25 (1H, br, CHI), 2.91 (1H, br, $CF_2CHH$), 2.67 (1H, br, $CF_2CHH$)

$^{19}$F NMR (376 MHz, $CDCl_3$):

δ −81.5 (3F, s, $CF_3$), −115.4 (2F, br, $CH_2CF_2CF_2$), −125.0 (2F, s, $CF_2$), −126.5 (s, $CF_2$)

Example 9

In a Pyrex tube, poly(phenyl-vinyl silsesquioxane) (90% phenyl, 10% vinyl, molecular weight: about 1000 to 1300) (575 mg) and $CF_3(CF_2)5I$ (220 mg) are were dissolved in a mixed solvent of $CH_2Cl_2$ (10 mL) and AsahiKlin (registered trademark) AK-225 (manufactured by Asahi Glass) (10 mL), and a sodium thiosulfate aqueous solution (396 mg) was added before applying ultraviolet light for 4 hours by using a 450 W high-pressure mercury lamp with stirring while keeping the reaction system at constant temperature. This reaction was performed twice, and the obtained reaction mixture was subjected to various purification operations to obtain a corresponding silsesquioxane compound (783 mg).

As a result of measurement of infrared absorption spectrum of the obtained silsesquioxane compound by infrared absorption spectroscopy, a novel peak was observed at 1240 $cm^{-1}$, and therefore, it was confirmed that the obtained silsesquioxane compound had $CF_3(CF_2)_5$—I added to the vinyl group. As a result of elemental analysis of the obtained silsesquioxane compound, it was confirmed that the F content was 1.26 wt % while the I content was 0.59 wt %.

Example 10

With 100 parts by mass of fluorine-containing elastomer, 10 parts by mass of the POSS compound obtained in Example 7 and 0.8 parts of the crosslinking agent 2,2-bis[3-amino-4-(N-phenylamino)phenyl]hexafluoropropane were preliminarily mixed in 1500 parts by mass of a fluorine-containing solvent, and the fluorine-containing solvent was volatilized at 70° C. under vacuum before kneading with an open roll to obtain a fluorine-containing elastomer composition. The fluorine-containing elastomer is a perfluoroelastomer comprising tetrafluoroethylene/perfluoroalkyl vinyl ether containing nitrile as a crosslinking group. For the fluorine-containing solvent, R-318 (main component: $C_4F_8Cl_2$) was used.

The obtained fluorine-containing elastomer composition was press-molded at 180° C. for 30 minutes. The composition after pressing was heat-treated at 290° C. for 18 hours. The obtained molded product was evaluated in terms of plasma resistance as described later, and an etching amount was 21.4 µm.

Example 11

A fluorine-containing elastomer composition was obtained as in Example 10 except that 10 parts by mass of the POSS compound obtained in Example 9 was used. A molded product of the obtained fluorine-containing elastomer composition was obtained as in Example 10. The obtained molded product was evaluated in terms of plasma resistance as described later, and an etching amount was 23.9 µm.

Example 12

A fluorine-containing elastomer composition was obtained as in Example 10 except that 10 parts by mass of the silicon-containing polymer obtained in Example 4 was used. A molded product of the obtained fluorine-containing elastomer composition was obtained as in Example 10. The obtained molded product was evaluated in terms of plasma resistance as described later, and an etching amount was 28.4 µm.

Comparative Example 1

A fluorine-containing elastomer composition was obtained as in Example 10 except that the fluorine-containing silicon compound was not used. A molded product of the obtained fluorine-containing elastomer composition was obtained as in Example 10. The obtained molded product was evaluated in terms of plasma resistance as described later, and an etching amount was 36.5 µm.

(Plasma Resistance Evaluation)
Irradiation Conditions:
Oxygen Plasma Irradiation Process
  Gas flow rate: 16 sccm
  Output: 400 W
  Pressure: 2.66 Pa
  Etching time: 30 minutes
Etching Amount Measurement:

A high-density plasma etching apparatus RIE-101iPH manufactured by SAMCO was used for measuring a level difference between a coated surface and an exposed surface to measure an etching amount. The measurement was performed twice, and the average value was defined as the etching amount.

As shown in the results described above, it was confirmed that use of the silsesquioxane of the present invention improves the oxygen plasma resistance of the fluorine-containing elastomer.

INDUSTRIAL APPLICABILITY

The fluorine-containing and silicon-containing compound of the present invention can be used for various applications such as additives and crosslinking agents for rubber materials.

The invention claimed is:

1. A fluorine-containing and silicon-containing compound of formula (I):

wherein:
A is each independently at each occurrence —$R^3$—$R^2$—$R^1$—$R^2$—$R^4$—;
$R^1$ is —(Si$R^7R^8$—O)$_p$—Si$R^7R^8$—;
$R^7$ is independently at each occurrence a hydrogen atom, an optionally substituted alkyl group having 1-8 carbon atoms, an optionally substituted alkenyl group having 1-8 carbon atoms, an optionally substituted aryl group, a vinyl group, a vinyloxy group, or a vinylalkyl group having 3-8 carbon atoms;
$R^8$ is independently at each occurrence a hydrogen atom, an optionally substituted alkyl group having 1-8 carbon atoms, an optionally substituted alkenyl group having 1-8 carbon atoms, an optionally substituted aryl group, a vinyl group, a vinyloxy group, a vinylalkyl group having 3-8 carbon atoms, or —$R^{11}$—$R^{12}$-Rf$^1$;
$R^{11}$ is a single bond or —($R^{25}$)$_x$—;
$R^{25}$ is each independently alkylene having 1-6 carbon atoms, arylene having 6-10 carbon atoms, or —O—;
x is an integer of 1 to 3;
$R^{12}$ is —C$R^{13}$=C$R^{14}$— or —C$R^{13}$X$^2$CH$R^{14}$;
$R^{13}$ is each independently a hydrogen atom, an alkyl group having 1-3 carbon atoms, an ester group, a nitrile group, a nitro group, an alkoxy group having 1-3 carbon atoms, or an aryloxy group;
$R^{14}$ is each independently a hydrogen atom, an alkyl group having 1-3 carbon atoms, an ester group, a nitrile group, a nitro group, an alkoxy group having 1-3 carbon atoms, or an aryloxy group;
$X^2$ is each independently a hydrogen atom, an iodine atom, a bromine atom, or a chlorine atom;
Rf$^1$ is each independently a fluorine-containing alkyl group having 2-10 carbon atoms;
p is an integer of 1 to 50;
$R^2$ is each independently a single bond or —($R^{26}$)$_y$—;
$R^{26}$ is each independently alkylene having 1-6 carbon atoms, arylene having 6-10 carbon atoms, or —O—;
y is an integer of 1 to 3;
$R^3$ is —C$R^5$=C$R^6$—, or —CH$R^5$C$R^6$X$^1$—;
$R^4$ is —C$R^6$=C$R^5$—, or —C$R^6$X$^1$CH$R^5$—;
$R^5$ is each independently a hydrogen atom, an alkyl group having 1-3 carbon atoms, an ester group, a nitrile group, a nitro group, an alkoxy group having 1-3 carbon atoms, or an aryloxy group;
$R^6$ is each independently a hydrogen atom, an alkyl group having 1-3 carbon atoms, an ester group, a nitrile group, a nitro group, an alkoxy group having 1-3 carbon atoms, or an aryloxy group;
$X^1$ is each independently an iodine atom, a bromine atom, or a chlorine atom;
B is independently at each occurrence a single bond or -Rf$^2$-;
Rf$^2$ is each independently a fluorine-containing alkylene group;
n is any integer not less than 5; and
$T^1$ and $T^2$ are each independently an end group.

2. The fluorine-containing and silicon-containing compound according to claim 1 which is a compound of formula (I-1):

wherein:
A is each independently at each occurrence —$R^3$—$R^2$—$R^1$—$R^2$—$R^4$—;
$R^1$ is —(Si$R^7R^8$—O)$_p$—Si$R^7R^8$—;

$R^7$ is independently at each occurrence a hydrogen atom, an optionally substituted alkyl group having 1-8 carbon atoms, an optionally substituted alkenyl group having 1-8 carbon atoms, an optionally substituted aryl group, a vinyl group, a vinyloxy group, or a vinylalkyl group having 3-8 carbon atoms;

$R^8$ is independently at each occurrence a hydrogen atom, an optionally substituted alkyl group having 1-8 carbon atoms, an optionally substituted alkenyl group having 1-8 carbon atoms, an optionally substituted aryl group, a vinyl group, a vinyloxy group, or a vinylalkyl group having 3-8 carbon atoms;

p is an integer of 1 to 50;

$R^2$ is each independently a single bond or $-(R^{26})_y-$;

$R^{26}$ is each independently alkylene having 1-6 carbon atoms, arylene having 6-10 carbon atoms, or $-O-$;

y is an integer of 1 to 3;

$R^3$ is $-CR^5=CR^6-$ or $-CHR^5CR^6X^1-$;

$R^4$ is $-CR^6=CR^5-$ or $-CR^6X^1CHR^5-$;

$R^5$ is each independently a hydrogen atom, an alkyl group having 1-3 carbon atoms, an ester group, a nitrile group, a nitro group, an alkoxy group having 1-3 carbon atoms, or an aryloxy group;

$R^6$ is each independently a hydrogen atom, an alkyl group having 1-3 carbon atoms, an ester group, a nitrile group, a nitro group, an alkoxy group having 1-3 carbon atoms, or an aryloxy group;

$X^1$ is each independently an iodine atom, a bromine atom, or a chlorine atom;

B is independently at each occurrence $-Rf^2-$;

Re is each independently a fluorine-containing alkylene group;

n is any integer not less than 1 than 5; and $T^1$ and $T^2$ are each independently an end group.

3. A composition comprising the fluorine-containing and silicon-containing compound according to claim 1.

4. An article comprising a base material and a film obtained by using the composition according to claim 3 on the base material.

5. A rubber material crosslinked by the compound according to claim 1.

6. A rubber composition comprising the compound according to claim 1; and a rubber material.

* * * * *